US012717580B2

(12) United States Patent
Muck et al.

(10) Patent No.: US 12,717,580 B2
(45) Date of Patent: Aug. 25, 2026

(54) STASHING SPECIFIC MERGE END TRIGGER FOR STASHING MERGED DATA

(71) Applicant: Arm Limited, Cambridge (GB)

(72) Inventors: Tiago Rogerio Muck, Austin, TX (US); Joshua Randall, Austin, TX (US); Thomas Philip Speier, Wake Forest, NC (US); Alexander Alfred Hornung, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/799,158

(22) Filed: Aug. 9, 2024

(65) Prior Publication Data

US 2026/0044344 A1 Feb. 12, 2026

(51) Int. Cl.

*G06F 9/30* (2018.01)
*G06F 12/0806* (2016.01)
*G06F 12/0815* (2016.01)

(52) U.S. Cl.

CPC ...... *G06F 9/30047* (2013.01); *G06F 9/30076* (2013.01); *G06F 12/0806* (2013.01); *G06F 12/0815* (2013.01)

(58) Field of Classification Search

CPC ............. G06F 9/30047; G06F 12/0806; G06F 12/0815; G06F 9/30076; G06F 3/0656
See application file for complete search history.

(56) References Cited

U.S. PATENT DOCUMENTS

2011/0202726 A1* 8/2011 Laycock ............. G06F 12/0815 711/E12.024
2011/0314224 A1* 12/2011 Piry .................... G06F 12/1027 711/E12.017
2012/0047332 A1* 2/2012 Bannon ............... G06F 12/0804 711/135
2014/0059271 A1* 2/2014 Meir ..................... G06F 3/0656 711/159

(Continued)

FOREIGN PATENT DOCUMENTS

| | | |
|---|---|---|
| WO | 2021/240140 | 12/2021 |
| WO | 2022/129869 | 6/2022 |
| WO | 2022/265552 | 12/2022 |

OTHER PUBLICATIONS

Robert Bedichek, "Some Efficient Architecture Simulation Techniques", Department of Computer Science, FR-35 University of Washington, 12 pages.

(Continued)

*Primary Examiner* — Idriss N Alrobaye
(74) *Attorney, Agent, or Firm* — NIXON & VANDERHYE P.C.

(57) ABSTRACT

When a merging condition is present, first processing element circuitry is responsive to control signals received the decoding of N data update instructions that each specify updated data to be made available for stashing to buffer the updated data. When the merging condition is no longer present in response to a stashing specific merge end trigger, the first processing circuitry issues a merged data update (Continued)

stashing transaction to interconnect circuitry specifying, as merged updated data, the updated data, to trigger stashing control circuitry to cause the merged updated data to be made available for stashing in an associated storage structure of at least one further processing element.

19 Claims, 17 Drawing Sheets

(56) References Cited

U.S. PATENT DOCUMENTS

2016/0371184 A1* 12/2016 Long ........................ G06F 3/065
2021/0042115 A1* 2/2021 Stephens ............. G06F 9/30105
2021/0374059 A1* 12/2021 Joao .................... G06F 12/0895
2022/0327057 A1* 10/2022 Beard ................. G06F 13/4027

OTHER PUBLICATIONS

International Search Report and Written Opinion of the International Searching Authority for PCT/GB2025/051294 mailed Sep. 23, 2025, 14 pages.

* cited by examiner

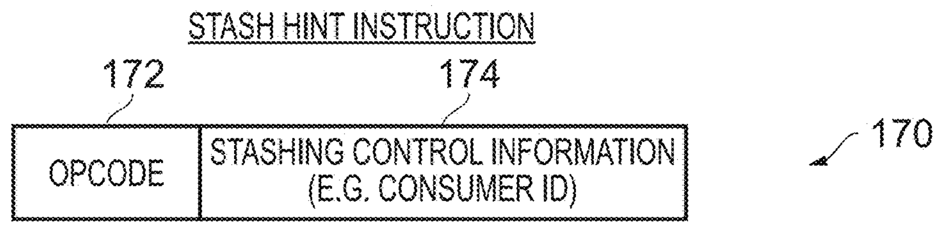

FIG. 4A

SNOOP FILTER STORAGE (STASHING CONTROL INFORMATION DERIVED FROM SNOOP FILTER INFO)

| ADDRESS INDICATION | PROCESSING ELEMENTS THAT MAY HAVE CACHED COPY OF DATA | | | |
|---|---|---|---|---|
| | PE 0 | PE 1 | PE 2 | PE 3 |
| 0x . . . . | ✓ | ✗ | ✓ | ✗ |
| | | | | |
| : | | | | |
| | | | | |

STASHING CONTROL STORAGE (STASHING CONTROL INFORMATION INDICATED BY CONSUMER REGISTRATION)

| ADDRESS INDICATION | PROCESSING ELEMENTS THAT HAVE REGISTERED INTENT TO READ DATA | | | |
|---|---|---|---|---|
| | PE 0 | PE 1 | PE 2 | PE 3 |
| 0x . . . . | | | ✓ | |
| | | | | |
| : | | | | |
| | | | | |

STASHING SPECIFIC MERGE END TRIGGER FOR STASHING MERGED DATA

BACKGROUND

The present technique relates to the field of data processing, and more particularly to techniques for facilitating the stashing of data generated within a data processing system.

In a data processing system, a number of components may be interconnected by interconnect circuitry, in order to allow communication between those components. The components may include a number of processing elements (for example central processing units (CPUs), graphics processing units (GPUs), accelerator devices, PCIe components/bridges, etc.) that can perform data processing operations, with the data processed by those processing elements being accessible in memory accessed by those processing elements via the interconnect circuitry.

In some instances, it may be required that the data produced by one of the processing elements needs to be made available to at least one of the other processing elements (for example a processing element may be arranged to perform a number of processing tasks on behalf of another processing element, and as a result generate data that the other processing element may subsequently require). One way to make that data available to the other processing element is for the processing element generating that data to write the data to a location in memory that is also accessible to the other processing element that subsequently requires that data. However, there can be significant latency associated with performing accesses to memory, along with significant energy consumption associated with such accesses.

In order to alleviate such issues, it is known to provide mechanisms that allow data generated by a first processing element to be stored directly into a local storage structure (for example a cache) of a second processing element (i.e. without the second processing unit needing to read that data from memory), this process being referred to as stashing the data. Such an approach thereby reduces the latency associated with the second processing element subsequently seeking to access that data, and can also reduce energy consumption by reducing the need to access main memory.

Processing elements often incorporate merge buffers that can be arranged to handle data in address aligned blocks of a particular block size, so that updated data generated by a sequence of store operations that all relate to the same address aligned block can be merged prior to writing that merged updated data into a local storage structure such as a cache and/or outputting that merged updated data as a transaction over the interconnect circuitry. Such an approach can enable more efficient utilisation of the available bandwidth and reduce power consumption. However, when it is known that updated data needs to be made available for stashing, it is desirable to make that data available within the second processing element as soon as possible.

SUMMARY

In accordance with a first example arrangement, there is provided an apparatus comprising: decoder circuitry within a first processing element to decode instructions, wherein the decoder circuitry is responsive to a sequence of instructions to generate control signals; processing circuitry within the first processing element that is responsive to the control signals to perform operations defined by the sequence of instructions; and an interface to couple the first processing element to interconnect circuitry; wherein: the processing circuitry is arranged, whilst a merging condition is determined to be present, to be responsive to the control signals received from the decoder circuitry due to decoding N data update instructions that each specify updated data to be made available for stashing, where N is an integer greater than or equal to 1, to buffer in a merge buffer the updated data specified by the N data update instructions; the processing circuitry is arranged, when the merging condition is determined to be no longer present, to initiate a merged data update stashing transaction via the interface specifying, as merged updated data, the updated data specified by the N data update instructions, in order to trigger stashing control circuitry accessible via the interconnect circuitry to cause the merged updated data to be made available for stashing in an associated storage structure of at least one further processing element coupled to the interconnect circuitry; and the processing circuitry is responsive to a stashing specific merge end trigger to determine that the merging condition is no longer present.

In accordance with another example arrangement, there is provided a method of controlling stashing of data, comprising: decoding a sequence of instructions within decoder circuitry of a first processing element in order to generate control signals; responsive to the control signals, performing within processing circuitry of the first processing element operations defined by the sequence of instructions; in response to the control signals received from the decoder circuitry due to decoding N data update instructions that each specify updated data to be made available for stashing, where N is an integer greater than or equal to 1, causing the processing circuitry to buffer the updated data specified by the N data update instructions whilst a merging condition is determined to be present; when the merging condition is determined to be no longer present, causing the processing circuitry to initiate a merged data update stashing transaction via an interface used to couple the first processing element to interconnect circuitry, the merged data update stashing transaction specifying, as merged updated data, the updated data specified by the N data update instructions, and triggering stashing control circuitry accessible via the interconnect circuitry to cause the merged updated data to be made available for stashing in an associated storage structure of at least one further processing element coupled to the interconnect circuitry; and responsive to a stashing specific merge end trigger, causing the processing circuitry to determine that the merging condition is no longer present.

In accordance with a still further example arrangement, there is provided a computer program comprising instructions which, when executed by a host data processing apparatus, control the host data processing apparatus to provide an instruction execution environment for executing target program code, the computer program comprising: instruction decoding program logic associated with a first processing element to decode instructions, wherein the instruction decoding program logic is responsive to a sequence of instructions to generate control signals; and data processing program logic associated with the first processing element to be responsive to the control signals to perform operations defined by the sequence of instructions; wherein: the data processing program logic is arranged, whilst a merging condition is determined to be present, to be responsive to the control signals received from the instruction decoding program logic due to decoding N data update instructions that each specify updated data to be made available for stashing, where N is an integer greater than or equal to 1, to buffer the updated data specified by the N data update instructions; the data processing program logic is arranged, when the merging condition is determined to be no longer present, to assert a merged data update stashing transaction to interconnect program logic, the merged data update stashing transaction specifying, as merged updated data, the updated data specified by the N data update instructions, and being arranged to trigger stashing control program logic accessible via the interconnect program logic to cause the merged updated data to be made available for stashing in storage emulating program logic used to emulate an associated storage structure of at least one further processing element coupled to the interconnect program logic; and the data processing program logic is responsive to a stashing specific merge end trigger to determine that the merging condition is no longer present. Such a computer program can be disposed in any known transitory computer-readable medium (such as wired or wireless transmission of code over a network) or non-transitory computer-readable medium such as semiconductor, magnetic disk, or optical disc.

In a yet further example arrangement, there is provided a computer-readable medium storing computer-readable code for fabrication of an apparatus in accordance with the first example arrangement discussed above. The computer-readable medium may be a transitory computer-readable medium or a non-transitory computer-readable medium.

BRIEF DESCRIPTION OF THE DRAWINGS

Further aspects, features and advantages of the present technique will be apparent from the following description of examples, which is to be read in conjunction with the accompanying drawings, in which:

FIGS. 4A to 4C illustrate different mechanisms by which stashing control information may be provided;

DESCRIPTION OF EXAMPLES

Figure 1:
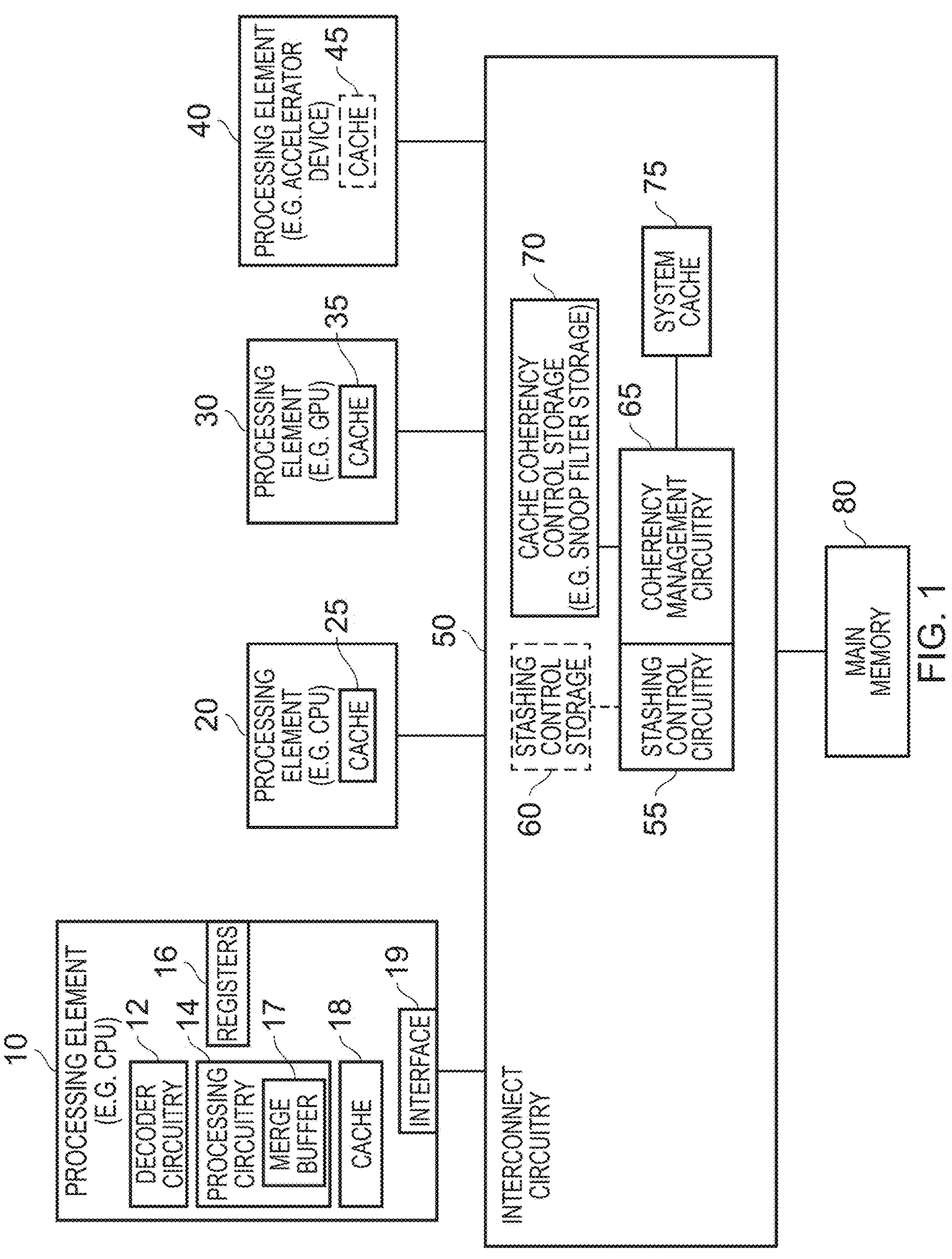
FIG. 1 is a block diagram of a data processing system in which the techniques described herein may be employed.

In accordance with one example implementation, an apparatus is provided that has decoder circuitry within a first processing element to decode instructions, the decoder circuitry being responsive to a sequence of instructions to generate control signals. The apparatus also has processing circuitry within the first processing element that is responsive to the control signals to perform operations defined by the sequence of instructions, and an interface to couple the first processing element to interconnect circuitry. In accordance with the techniques described herein the processing circuitry is arranged, whilst a merging condition is determined to be present, to be responsive to the control signals received from the decoder circuitry due to decoding N data update instructions that each specify updated data to be made available for stashing, to buffer in a merge buffer the updated data specified by the N data update transactions. N is an integer greater than or equal to 1, and hence data generated by one or more data update instructions may be merged within the merge buffer whilst the merging condition is present.

There are a variety of ways in which the processing circuitry may determine that the updated data specified by the data update instruction is updated data to be made available for stashing. For example, the actual form of the data update instruction itself may indicate that the updated data generated as a result of executing that instruction is to be made available for stashing. Alternatively, as described elsewhere herein, a stash hint instruction may be associated with a given data update instruction to indicate that the updated data generated as a result of executing that given data update instruction should be made available for stashing. As a yet further example, the hardware may determine, based on the prevailing state of the system, that updated data generated by executing a standard data update instruction, even in the absence of the above-mentioned stash hint instruction, should be made available for stashing.

In accordance with the techniques described herein, the processing circuitry is further arranged, when the merging condition is determined to be no longer present, to initiate a merged data update stashing transaction via the interface specifying, as merged updated data, the updated data specified by the N data update instructions. This then triggers stashing control circuitry accessible via the interconnect circuitry to cause the merged updated data to be made available for stashing in an associated storage structure of at least one further processing element coupled to the interconnect circuitry. By allowing one or more items of updated data that are to be made available for stashing to be merged within the merge buffer, before then issuing a single stashing transaction specifying that updated data, this can enable more efficient use of the available bandwidth of the interconnect circuitry. Further, it can reduce the overall latency associated with stashing the updated data specified by the N data update instructions, since if instead the first item of updated data were to be issued as a stashing transaction without waiting to see if any merging with later generated items of updated data would be appropriate, this could significantly impact the latency associated with stashing those later generated items of updated data. This is due to the fact that typically the first processing element would need to wait for some form of acknowledgement from the interconnect circuitry in relation to the first issued stashing transaction before it would be able to issue any additional stashing transaction(s).

Nevertheless, as noted earlier, when it is known that updated data generated by a first processing element needs to be made available for stashing, it is desirable to make that data available within the at least one other processing element as soon as possible, and hence to allow the merging condition to remain present for as long as it might otherwise do if the associated updated data were not going to be made available for stashing may significantly impact latency associated with stashing the updated data. However, in accordance with the techniques described herein the processing circuitry is configured to be responsive to a stashing specific merge end trigger to determine that the merging condition is no longer present. By such an approach, it is possible to obtain the bandwidth benefits associated with reducing the overall number of transactions that would otherwise be issued over the interconnect circuitry, whilst also enabling an overall reduction in latency associated with stashing the updated data in situations where there are multiple items of updated data that are to be made available for stashing that can be merged to form updated data for a single merged data update stashing transaction. The use of the stashing specific merge end trigger enables the processing circuitry to judge when further continuation of the merging condition is unlikely to be useful, thus allowing the merging condition to be terminated at that point and thus enabling the merged data update stashing transaction to be issued.

Hence, in summary, merge buffers can be arranged to handle data in address aligned blocks of a particular block size, and when a given address aligned block contains one or more items of updated data that is to be stashed, then the above described techniques can be used to control the termination of the merging condition for that given address aligned block, and hence potentially enable an earlier decision as to when the updated data associated with that given address aligned block can be output via a merged data update stashing transaction. It should be noted that not all of the items of updated data within the given address aligned block necessarily need to relate to items of updated data that have been flagged for stashing.

There are a number of techniques that can be used to provide the stashing specific merge end trigger. However, as it can be difficult for hardware to detect, in the general case, when further items of updated data are likely to be generated that also need to be made available for stashing, and that could be merged with preceding generated items of updated data, it can be useful not having to rely on the hardware detecting when to raise the stashing specific merge end trigger. In accordance with one example implementation, this is achieved through the use of a merge end hint instruction that can be added into a sequence of instructions to indicate when it is appropriate to raise the stashing specific merge end trigger. In particular, the decoder circuitry can be arranged to be responsive to the merge end hint instruction in the sequence of instructions to issue at least one control signal to cause the processing circuitry to determine presence of the stashing specific merge end trigger. The provision of such a merge end hint instruction enables a programmer, library or compiler to indicate when it would be appropriate to terminate the merging condition that had been set to allow merging of one or more items of updated data that are to be made available for stashing. This hence enables a software hint to be provided to the hardware, avoiding the merging condition from being maintained beyond the point where it is useful, which can result in significantly reduced latency and improved throughput in a data processing system.

The merge end hint instruction can be used in a variety of ways, but in one example implementation is positioned within the sequence of instructions so as to enable the processing circuitry to determine a final data update instruction amongst the N data update instructions whose specified updated data should be included in the merged updated data. In one particular example implementation, the merge end hint instruction can be associated with a given data update instruction in the sequence of instructions, to indicate that that given data update instruction will be the last data update instruction that will generate updated data for stashing that should be included in the merged updated data.

The merge end hint instruction can be associated with the given data update instruction in a variety of ways. For example, the given data update instruction may be a next data update instruction following the merge end hint instruction in the sequence of instructions. However, in another example implementation, the merge end hint instruction may not be associated with any particular data update instruction per se, but instead may indicate a boundary point between one or more instructions that will generate updated data to be stashed, where that updated data can be merged, and subsequent instructions that will not generate such data. Hence, in one example implementation, the merge end hint instruction may be arranged to indicate that no more updated data to be included in the merged updated data is expected to be specified by any data update instruction included in the sequence of instructions after the merge end hint instruction in program order.

The techniques described herein involving the use of the merge end hint instruction can be employed irrespective of whether the hardware executes the sequence of instructions in program order, or allows out of order execution. When considering out of order execution, then it is still the case that by the time execution of the merge end hint instruction is committed, all earlier data update instructions in program order will have been resolved and their associated updated data will be present within the merge buffer.

Irrespective of whether or not the above described merge end hint instruction is used as a mechanism for asserting the stashing specific merge end trigger, in some example implementations one or other mechanisms may be used to also cause assertion of the stashing specific merge end trigger. As discussed earlier, the merge buffer may be arranged to handle data in address aligned blocks of a given block size, referred to herein as block size B. The size B may vary, but in one example implementation may be the same size as a cache line. Alternatively, if desired, the size B may be larger than the size of a cache line. The merge buffer is arranged to merge a given data item received by the merge buffer into a given address aligned block selected in dependence on an address of the given data item. Within one such example implementation, the processing circuitry may be arranged to detect the stashing specific merge end trigger when at least one of the following conditions is detected:

- the updated data to be made available for stashing fills an entire address aligned block;
- the updated data to be made available for stashing, at least when a given update pattern is present, reaches a block boundary of a given address aligned block into which the updated data is being merged.

Regarding the second option above, whilst the stashing specific merge end trigger may be detected whenever such a block boundary is reached, detection of the stashing specific merge end trigger in that scenario may be contingent on a particular pattern of updates being detected. For example, the updates may be progressing from a point partway through the address aligned block up to the end of the address aligned block, and in that scenario when updated data is provided for merging into the final location of the address aligned block, at which point the block boundary has been reached, the processing circuitry may be arranged to determine presence of the stashing specific merge end trigger.

In one example implementation, if the processing hardware is arranged to detect the above scenarios, and thus detect the stashing specific merge end trigger, then in implementations that also support use of the earlier described merge end hint instruction, the merge end hint instruction would not need to be used in those scenarios, and instead can be used in other situations that the processing hardware would not automatically detect. By way of specific example, the merge end hint instruction may be more useful to use to indicate situations where multiple parts of a cache line are being updated, but not the entire cache line, for example if a couple of fields of a data structure are updated for propagation to a consumer for stashing in that consumer's local cache.

In one example implementation, the processing circuitry may be responsive to a stashing prioritisation trigger to prioritise for retention in the merge buffer, until the stashing specific merge end trigger is detected, an address aligned block containing updated data to be made available for stashing. On occurrence of certain events, the merge buffer will be required to output some of the data held therein. For example, when a fullness threshold is reached, the merge buffer will typically output the merged data for one or more address aligned blocks in order to free up space for receiving new data. However, if it is known that, for a given address aligned block containing data to be stashed, there is an expectation that the stashing specific merge end trigger will be generated in due course to identify when a merged data update stashing transaction should be issued for the data of that given address aligned block, then it can be beneficial to seek to retain that given address aligned block within the merge buffer, and instead output the data for one or more other address aligned blocks in order to free up the required space within the merge buffer.

There are various ways in which the stashing prioritisation trigger could be generated. For example, an explicit retention hint instruction could be provided that could then be added to the sequence of instructions to identify when it is desired to prioritise for retention in the merge buffer an address aligned block containing updated data to be made available for stashing. Alternatively, there may be considered no need for an explicit instruction, and instead the stashing prioritisation trigger could be generated in other scenarios. For example, considering the earlier discussed stash hint instruction, a stash hint instruction is used to identify that an associated store instruction should be considered as generating updated data for stashing, and if desired the occurrence of the stash hint instruction could be used to generate the stashing prioritisation trigger. As a yet further example, the stashing prioritisation trigger could be used when the apparatus is operating in certain modes of operation (as indicated for example by the value in a control register), and is generating data for stashing.

In one example implementation, the processing circuitry is arranged, on detection of a given event, to open a merging window, to consider the merging condition to be present whilst the merging window is open, and to close the merging window in response to the stashing specific merge end trigger. The time at which the merging window is closed as a result of detecting the stashing specific merge end trigger may vary dependent on implementation. For example, considering a scenario where the stashing specific merge end trigger is generated as a result of executing the earlier-mentioned merge end hint instruction, then the merging window may be closed once all of the relevant preceding data update instructions in program order have been executed, and their generated data added to the merge buffer.

In one particular example implementation, the processing circuitry is arranged to detect the given (merging window opening) event in association with processing a given data update instruction that provides updated data for a given address aligned block into which the updated data to be made available for stashing is to be merged. In one example implementation, most types of data update instruction (also referred to herein as a store instruction) may be arranged to open a merging window if they are the first encountered store instruction relating to a given address aligned block, and hence the merging window is not yet open for that given address aligned block. When subsequent store instructions are encountered that are generating data to be merged into the same given address aligned block, then the generated data is merely merged into the block without opening another merging window (i.e. there will typically be only one active merging window for each address aligned block being processed by the merge buffer).

The associated storage structures referred to herein can take a variety of forms, but in one example implementation each associated storage structure is a cache used the cache data for access by each processing element that has access to that associated storage structure.

The data update instructions that specify updated data to be made available for stashing can take a variety of forms. For instance, in one example implementation, at least one of the N data update instructions that specifies updated data to be made available for stashing is a given data update stashing instruction, i.e. is a particular form of data update instruction that identifies that the generated data is to be stashed.

However, it is not necessary for the data update instructions to take that form. For example, the decoder circuitry may be responsive to a stash hint instruction associated with a given data update instruction in the sequence of instructions, to issue control signals to cause the processing circuitry to respond to the given data update instruction by treating the given data update instruction as being one of the N data update instructions that specifies updated data to be made available for stashing. Hence, the use of the stash hint instruction identifies that the associated data update instruction is to be treated as an instruction that is generating updated data for stashing. The given data update instruction associated with the stash hint instruction can be identified in a variety of ways, but in one example implementation it is the next data update instruction following the stash hint instruction in the sequence of instructions.

As a yet further example, the hardware may, under certain situations, determine that the data being generated by a standard data update instruction (i.e. one without any associated stash hint instruction) should be stashed in a local storage structure of another processing element, and hence will treat that data update instruction as being one of the earlier-mentioned N data update instructions.

In one example implementation, the processing circuitry has a local associated storage structure (for example a local cache). When the above-mentioned stash hint instruction is used, then in one example implementation that stash hint instruction may identify whether the updated data specified by the associated given data update instruction should be stored in the local associated storage structure as well as being included within the merged updated data to be made available for stashing in the associated storage structure of the at least one further processing element coupled to the interconnect circuitry. In some instances, it may be useful to also store that updated data in the local storage structure of the generating processing element, but in other situations that may not be necessary as the generating processing element may have no further use for the data, and in that case the updated data can merely be output via the interconnect circuitry for stashing in the at least one further processing element without being locally cached.

As mentioned earlier, when the merged data update stashing transaction is issued, this triggers stashing control circuitry accessible via the interconnect circuitry to cause the merged updated data to be made available for stashing. There are a number of ways in which the stashing control circuitry may be arranged to determine which associated storage structure or associated storage structures to make the updated data available for stashing in. In one example implementation, the stashing control circuitry is arranged, responsive to the merged data update stashing transaction, to reference stashing control information to determine, from amongst a plurality of further processing elements coupled to the interconnect circuitry, one or more candidate further processing elements for stashing of the merged updated data, each candidate further processing element having an associated storage structure. The stashing control circuitry may then be arranged to cause one or more stashing control signals to be issued to each candidate further processing element to enable the merged updated data to be stashed in that candidate further processing element's associated storage structure. In situations where a candidate further processing element has more than one associated storage structure in which the updated data could be stashed, then whilst in one example implementation the stashing control signals could indicate into which associated storage structure the updated data is to be stashed, in another example implementation that decision may be taken by the candidate further processing element.

There are a number of ways in which the stashing control information can be made available to the stashing control circuitry. However, in one example implementation the apparatus further comprises a stashing control storage to maintain the stashing control information referenced by the stashing control circuitry. The stashing control storage could be a separate storage structure provided solely for the purpose of maintaining stashing control information, or alternatively an existing storage structure may be arranged to incorporate the stashing control information.

In one particular example implementation where the associated storage structures of the one or more candidate further processing elements are caches, the stashing control storage may be provided by cache coherency control storage used to maintain a record, for each memory address of a plurality of memory addresses, of which caches may be storing a copy of the data associated with that memory address. Such cache coherency control storage may also be referred to as a snoop filter storage, and is typically used by cache coherency circuitry to determine which caches to issue snoop requests to in order to implement required cache coherency operations to make sure that all of the processing elements maintain a coherent view of data. It should be noted that such a snoop filter storage may not necessarily be fully accurate, for example due to a cache that did have a copy of a certain item of data no longer having a copy of that data, and this can result in some false positives where a snoop request is issued to a cache that no longer has a copy of the data in question. However, this does not affect correct operation but instead merely results in the occasional issuance of a snoop request that is not needed.

Since such cache coherency control storage is already arranged to seek to keep track, for each of a number of memory addresses, of which caches may store copies of the data at those memory addresses, the information maintained therein can in one example implementation be used "as is" to form the stashing control information used by the stashing control circuitry to determine candidate further processing elements for stashing of the updated data. For example, if a first processing element produces updated data for a particular memory address, and it is known that a certain other processing element has cached a copy of the data for that particular memory address, it may in one example implementation be determined that the updated data should be made available to that other processing element for stashing in its cache.

In another example implementation, the stashing control information may be generated in another manner, and may be stored within a dedicated storage structure, or as additional information within an existing storage structure, for example as additional information within the above-mentioned cache coherency control storage. For instance, in one implementation the stashing control storage may be arranged to maintain, as the stashing control information, one or more memory address indications and, for each memory address indication, an indication of one or more processing elements that have registered an interest in having the data associated with that memory address indication stashed in their associated storage structure. Hence, in accordance with such an example implementation, one or more processing elements may be provided with a mechanism to explicitly register an interest in having data associated with a given memory address indication stashed in their associated storage structure. The memory address indication that may be identified by such a processing element when registering an interest in having certain data stashed can take a variety of forms. For instance, the memory address indication may identify a specific memory address (for example associated with a particular item of data, or with a block of data items whose collective size is the size of a single cache line) or may be used to specify an address range covering multiple such blocks of data.

In an alternative implementation, rather than providing a stashing control storage to maintain stashing control information that is referenced by the stashing control circuitry, the stashing control information may be specified by the merged data update stashing transaction. Hence, in such an implementation, the processing element that initiates the merged data update stashing transaction may itself specify stashing control information, and hence for example may identify one or more processing elements to which the updated data should be made available for stashing in their local storage structure(s).

In one example implementation, the apparatus further comprises interconnect circuitry to interconnect a plurality of elements that are coupled to the interconnect circuitry, the plurality of elements comprising at least the first processing element and the at least one further processing element mentioned earlier. In such an example implementation, multiple processing elements amongst the first processing element and the at least one further processing element may have associated storage structures, and the interconnect circuitry may be provided with coherency management circuitry to maintain coherency of data accessible by the multiple processing elements. In one such example implementation, the stashing control circuitry may be associated with the coherency management circuitry to cause the one or more stashing control signals to be integrated with coherency control signals issued by the coherency management circuitry to maintain coherency for the updated data. This can provide a particularly efficient implementation by using the communication paths already in place to support the issuance of coherency control signals to also disseminate the required stashing control signals.

Particular examples will now be described with reference to the figures.

FIG. 1 is a block diagram of a data processing system in which the techniques described herein may be employed. Within the system, a variety of processing elements 10, 20, 30, 40 may be coupled to interconnect circuitry 50, and may be arranged to share access to data stored in main memory 80. The processing elements can take a variety of different forms, for example a central processing unit (CPU) 10, 20, a graphics processing unit (GPU) 30, or other forms of processing element such as an accelerator device 40 used to perform certain operations on behalf of another processing element.

Considering by way of example the processing element 10, that processing element may include decoder circuitry 12 that is arranged to decode a sequence of instructions in order to generate control signals that are then provided to the processing circuitry 14. The processing circuitry is then responsive to those control signals to perform the operations defined by the sequence of instructions. During performance of those operations, the processing circuitry 14 may read source data from registers of a register set 16, and indeed may store result data back to one or more of those registers. Load instructions may be used to load data from the memory system into the registers, whilst store instructions may be used to store data from the registers back to the memory system. In addition to the main memory 80, the memory system may include one or more levels of cache used to cache a subset of the data stored in main memory.

As shown in FIG. 1, the processing element 10 may have a local cache 18 in which to cache a subset of the data. In typical systems a multilevel cache hierarchy may be used, where a number of levels of cache are situated between the processing circuitry 14 of the processing element 10 and main memory 80. One or more levels of cache may be provided locally to a particular processing element, whilst other caches may be shared caches that are accessed by more than one processing element, and are accessed by the processing element 10 issuing access requests to the interconnect circuitry via its interface 19. Hence, the processing element 10 may have one or more levels of local cache (only a single box 18 is shown for simplicity but in some cases more than one local cache may be present), but may also have access to a shared cache such as the system cache 75. As schematically illustrated in FIG. 1, various of the other processing elements may also have local caches, and hence the processing element 20 may have one or more local caches 25, the processing element 30 may have one or more local caches 35, and in some instances the accelerator device 40 may have one or more levels of local cache 45. In one example implementation, each of the processing elements may also have access to the system cache 75.

Whilst for simplicity the details of the processing elements 20, 30, 40 are not shown in FIG. 1 (other than the presence of local caches), in one example implementation one or more of the processing elements may be constructed in an identical manner to that discussed above in respect of the processing element 10.

In a system where multiple processing elements have local caches, a cache coherency protocol will typically be implemented in order to ensure that each processing element has a coherent view of the data. Such a cache coherency protocol may be implemented by coherency management circuitry 65, which can be arranged to have access to cache coherency control storage 70, which may also be referred to herein as snoop filter storage. When one of the processing elements seeks to access an item of data, it may be arranged to output an access request to the interconnect circuitry 50 via its interface 19 specifying the memory address to be accessed, and that access request may be reviewed by the coherency management circuitry 65 in order to determine whether any cache coherency actions need to be implemented when servicing the access request. The snoop filter storage 70 can be used to maintain, for each of a number of memory addresses, an indication of which processing elements 10, 20, 30, 40 are understood to have cached a copy of the data at that memory address in their local caches 18, 25, 35, 45.

Hence, based on a given memory address associated with an access request, the coherency management circuitry 65 may perform a lookup within the snoop filter storage 70 to determine whether any of the other processing elements are understood to have a cached copy of the data for that memory address in their local caches, and in that event can be arranged to issue snoop requests to any such processing elements to cause those processing elements to carry out a coherency action in respect of any cached copy of the data that those processing elements have. Purely by way of example, if the processing element 10 issues a write access request indicating that it wishes to write an updated value for a specified memory address, and the coherency management circuitry 65 determines that processing element 30 currently holds a cached copy of that data, it may send a snoop request to the processing element 30 to cause it to invalidate its copy of the data, and on receipt of the snoop response indicating that the processing element 30 has invalidated the data, the coherency management circuitry 65 may then permit the processing element 10 to store the updated data. At this point, the processing element may store the updated data in its local cache, or in some instances may output the data for storing at a lower level in the memory hierarchy, for example in the system cache 75 or the main memory 80.

There are many situations where there are program threads running on the various processing elements 10, 20, 30, 40, and one program thread executing on one processing element (also referred to herein as the producer processing element) may at some point generate data that is to be consumed by a program thread executing on a different processing element (also referred to herein as the consumer processing element). One way to share that data is to propagate that data to a level of the memory hierarchy from which the consumer processing element can access that data, and hence for example to propagate the data to the system cache 75 or main memory 80 in the example of FIG. 1. However, there can be significant latency associated with performing accesses to the lower levels of the memory hierarchy, along with significant energy consumption associated with such accesses. To reduce latency and energy consumption, and also improve performance, it can be desirable for the updated data produced in such instances by the producer processing element to be provided for stashing in a local cache associated with the consumer processing element. However, it can be difficult for the hardware to detect scenarios where such stashing would be appropriate.

In accordance with the techniques described herein, mechanisms are provided that can provide a great deal of flexibility in the use of stashing, and in particular provide hints to the hardware to facilitate such stashing. More particularly, stashing control circuitry 55 is provided that can be arranged to respond to such hints in order to arrange for updated data generated for a given memory address to be made available for stashing in a local cache associated with a processing element that the hint indicates is a probable consumer processing element for the updated data. During the operation of the stashing control circuitry, the stashing control circuitry may have access to stashing control storage 60 which can be arranged to store stashing control information used by the stashing control circuitry to determine, from amongst the plurality of processing elements 10, 20, 30, 40, one or more of those processing elements that are candidates for stashing of the updated data generated for a given memory address. As will be discussed in more detail later, whilst the stashing control circuitry 55 may be a separate piece of logic distinct from the coherency management circuitry 65, in some instances the stashing control circuitry can be highly integrated with the coherency management circuitry, with stashing indications generated for sending to determined consumer processing elements to facilitate the stashing of updated data being integrated with snoop request signals sent to the processing elements to implement the cache coherency protocol. When adopting such an implementation, it may be the case that the stashing control storage 60 can be integrated within the snoop filter storage 70, as will be discussed in more detail later.

Typically, when updated data is generated by the processing circuitry, it may be buffered within a merge buffer 17. In particular, the merge buffer may be arranged to handle data in address aligned blocks of a particular size, for example a cache line size, but individual store instructions may identify smaller sized items of data. A significant improvement in bandwidth utilisation of the communication paths with the associated local cache(s) 18, and indeed of the communication paths used to implement the interconnect circuitry 50 can be achieved if multiple updated items of data can be merged within the merge buffer and then a single transaction can be initiated specifying the resultant merged data.

As discussed earlier, whilst such an approach can significantly improve bandwidth utilisation, it causes some issues when the updated data in question is data that has been identified as to be made available for stashing, since generally it will be desirable to make that updated data available as soon as possible in the local cache of the processing element that is to stash that data (that processing element also being referred to herein as the stashee). However, as noted earlier, merely initiating a transaction straightaway in relation to an item of updated data generated as a result of executing a store instruction, if that updated data is identified as being for stashing, can actually impact overall latency associated with making updated data available in the stashee's local cache, for example if one or more subsequent store instructions were also to generate further items of stashable updated data relating to the same address aligned block. As will be discussed in more detail later with reference to FIGS. 11 to 16, these issues can be alleviated through the use of a stashing specific merge end trigger used by the processing circuitry to determine when to close a merging window in relation to updated data that is being generated for stashing, and in one particular example implementation a merge end hint instruction is used as a mechanism for generating the stashing specific merge end trigger.

Figure 2:
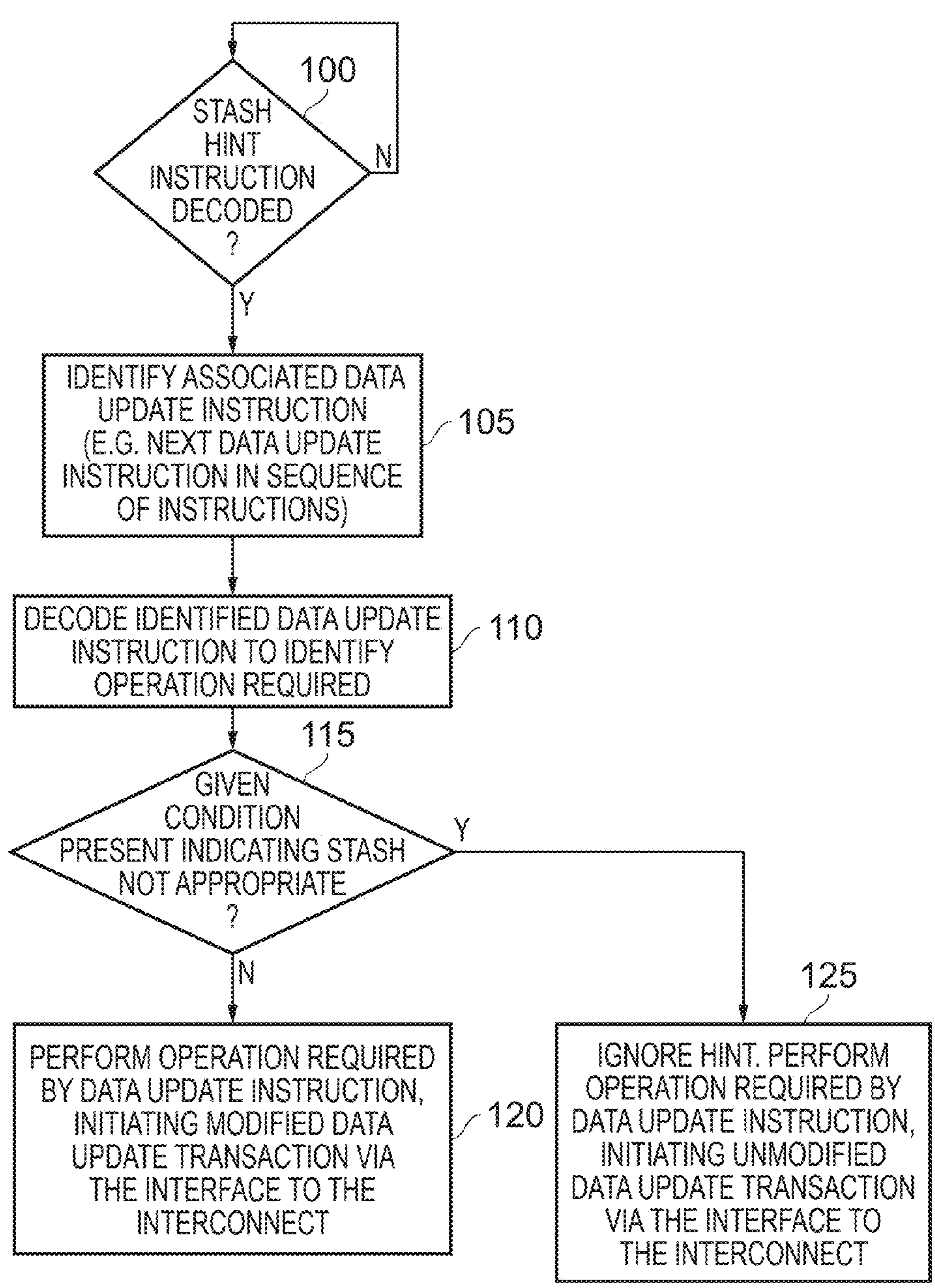
FIG. 2 is a flow diagram illustrating steps that may be performed in response to a stash hint instruction.

FIG. 2 is a flow diagram illustrating steps that may be performed in response to a stash hint instruction. In particular, one of the processing elements 10, 20, 30, 40 may execute a sequence of instructions that includes one or more instances of a stash hint instruction. At step 100, if it is determined that the stash hint instruction has been decoded, then at step 105 an associated data update instruction is identified for the stash hint instruction. There are a number of ways in which the associated data update instruction may be identified, but in one example implementation it may be the next instruction of a particular type within the instruction sequence, and in one particular example implementation the stash hint instruction will be included within the sequence directly before the relevant data update instruction.

Once the associated data update instruction has been identified, that instruction will be decoded at step 110 in order to identify the update operation required. At step 115, it may be determined whether a given condition is present indicating that stashing of the updated data that will be generated as a result of the data update instruction is not appropriate. Purely by way of example, if from the cache state or history the processing element performing the process of FIG. 2 determines that a stashing of the updated data is unlikely to be useful, that processing element could ignore the stash hint instruction and merely cause an unmodified data update transaction to be initiated, as indicated by step 125. This could for example be useful in situations where a program is running in single threaded mode, if two or more threads that would share the data are running on the same processing element, or if it is determined that a thread may update a location or a cache line multiple times consecutively. As indicated by step 125, at this point an appropriate request signal may be issued via the interface 19 to the interconnect circuitry 50 to initiate the unmodified data update transaction in order to perform the operation required by the data update instruction.

However, if that given condition is determined not to be present, the process may be arranged to proceed to step 120 where the operation required by the data update instruction is performed, but by causing a modified data update transaction to be initiated via the interface 19 to the interconnect circuitry 50. The handling of such a modified data update transaction will be discussed in detail below with reference to FIG. 3.

Whilst in the example of FIG. 2, an assessment as to the presence or not of the given condition is performed at step 115, in an alternative example implementation it may be arranged that modified data update transaction is always performed in the presence of the stash hint instruction, and accordingly step 115, and the associated branch to step 125, may be omitted, with the process proceeding directly from step 110 to step 120.

Figure 3:
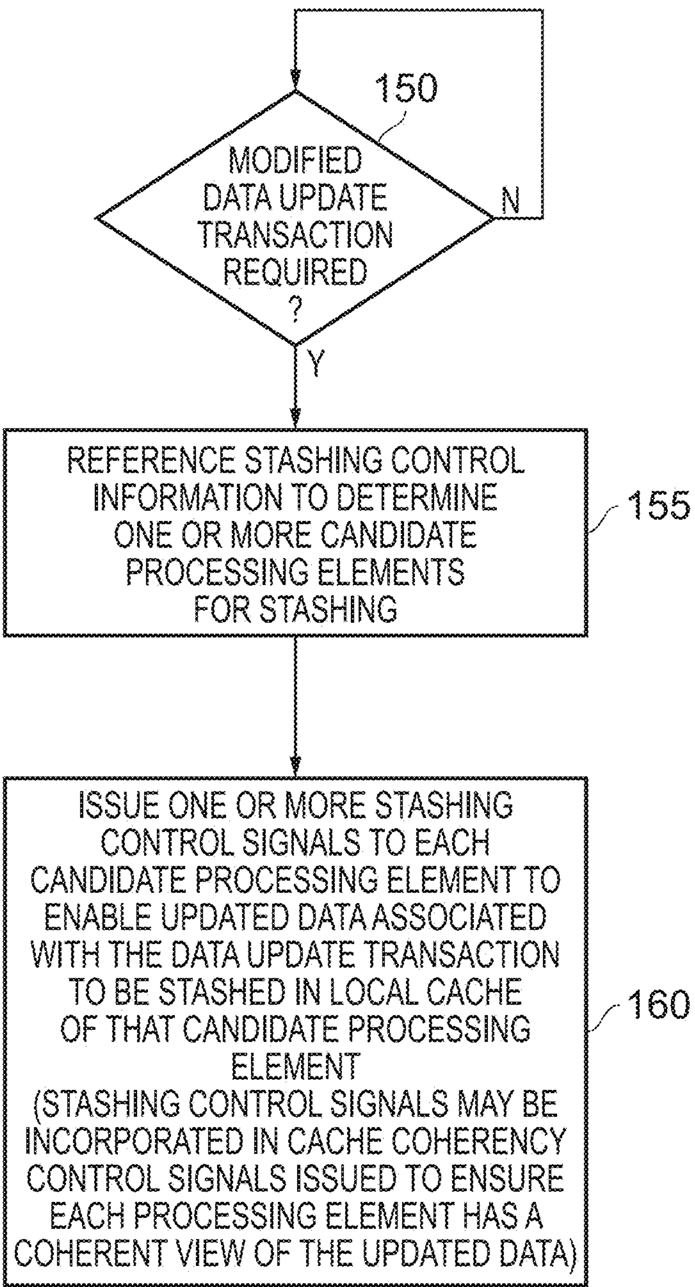
FIG. 3 is a flow diagram illustrating steps that may be performed upon detection of a modified data update transaction.

FIG. 3 is a flow diagram illustrating steps taken by the stashing control circuitry upon receipt of a request indicating that a modified data update transaction is to be performed. When the need for such a modified data update transaction is determined at step 150, then at step 155 the stashing control circuitry 55 references stashing control information in order to determine one or more candidate processing elements for stashing. There are a variety of ways in which the stashing control information may be made available to the stashing control circuitry, some examples of which will be discussed later with reference to FIGS. 4A to 4C.

Assuming at least one candidate processing element for stashing is determined from the stashing control information, then the process proceeds to step 160 where one or more stashing control signals are issued to each candidate processing element to enable updated data associated with the data update transaction to be stashed in the local cache of that candidate processing element. As will be discussed in more detail later, in one example implementation such stashing control signals may be incorporated in cache coherency control signals issued to ensure that each processing element has a coherent view of the updated data.

FIG. 4A illustrates one mechanism that may be used for providing the stashing control information to the stashing control circuitry. In the example of FIG. 4A, the stashing control information is incorporated directly within the stash hint instruction. Hence, an opcode field 172 of the stash hint instruction 170 may identify that the instruction is a stash hint instruction, whilst the field 174 may be used to provide stashing control information. This could for example take the form of an identifier for the consumer processing element that is understood to require the updated data. If desired, field 174 could be used to specify the identifier for more than one consumer processing element if it is understood that multiple consumer processing elements may require the updated data. When adopting the implementation of FIG. 4A, the consumer identifier information specified by the stash hint instruction can be incorporated within the modified data update transaction issued from the interface of the processing element that has executed the stash hint instruction, with the stashing control circuitry 55 then referencing that information during step 155 of FIG. 3.

FIG. 4B illustrates an alternative example of how the stashing control information may be provided. In this example, the information maintained in the snoop filter storage 70 is used directly as the stashing control information. FIG. 4B illustrates an example of snoop filter storage 180, the snoop filter storage 180 including a number of entries 182. Each entry can be populated to identify an address indication for a memory address, and for each of the various processing elements that may be able to cache a copy of that data, the entry includes a field to identify whether that processing element is understood to have cached a copy of the data or not. For the example shown in FIG. 4B, in particular looking at the first entry 182 of the snoop filter storage 180, the information indicates that processing element 0 and processing element 2 may have cached a copy of the data. If, by way of illustration, processing element 0 is the producer processing element that has executed the stash hint instruction and is performing the data update operation, then the information in the snoop filter storage can be used by the stashing control circuitry at step 155 to determine that processing element 2 is a candidate processing element for stashing, and as a result one or more stashing control signals can be issued to the processing element 2 at step 160 of FIG. 3 to enable the updated data to be made available for stashing in the local cache of processing element 2.

FIG. 4C illustrates another example implementation, where the stashing control information is maintained within a stashing control storage, and in this example the stashing control information is based on indications made by consumer processing elements of their interest in having certain data stashed in their local cache. Hence, the stashing control storage 190 may include a plurality of entries 192, and in a similar way to that discussed earlier for the snoop filter storage each entry may have an address indication allocated therein identifying a particular memory address. In addition, fields are provided within each entry to enable an indication to be kept of any processing elements that have registered an interest in having updated data for the allocated memory address stashed in their local cache, such an interest also being referred to herein as an intent to read the updated data. Hence, by way of example, considering the top entry 192 within the stashing control storage 190, it is indicated that processing element 2 has registered an intent to read updated data associated with the memory address allocated to that entry, and accordingly if a modified data update transaction is initiated in respect of that memory address, then the stashing control circuitry can determine at step 155, with reference to the stashing control storage 190, that processing element 2 is a candidate processing element for stashing, and accordingly at step 160 can issue one or more stashing control signals to processing element 2 to enable the updated data to be made available for stashing in the local cache of processing element 2.

Whilst the stashing control storage 190 could be an entirely separate storage used solely for maintaining stashing control information, in another example implementation the stashing control storage could be implemented by appropriate modification to an existing storage structure. For example, the snoop filter storage 180 could be adapted to include additional information representing stashing control information. Hence, an entry allocated in the snoop filter storage for a given memory address may then identify not only which processing elements are understood to have cached a copy of that data, but also identify any processing elements that have registered an intent to read that data.

There are a variety of ways in which a processing element may be identified as having an interest in reading data for a specified memory address, with that identified interest being used as a hint by the stashing control circuitry that it may be appropriate to seek to stash updated data for that specified memory address in the local cache of the processing element that has been identified as having an interest in the updated data. For example, prediction circuitry may be provided within the system to seek to make predictions as to processing elements that may be interested in the data for certain memory addresses, for example based on past behaviour. However, in one example the registering of an interest in certain data is achieved by a consumer processing element executing a stashee hint instruction. Such an approach will be discussed further with reference to FIG. 5.

Figure 5:
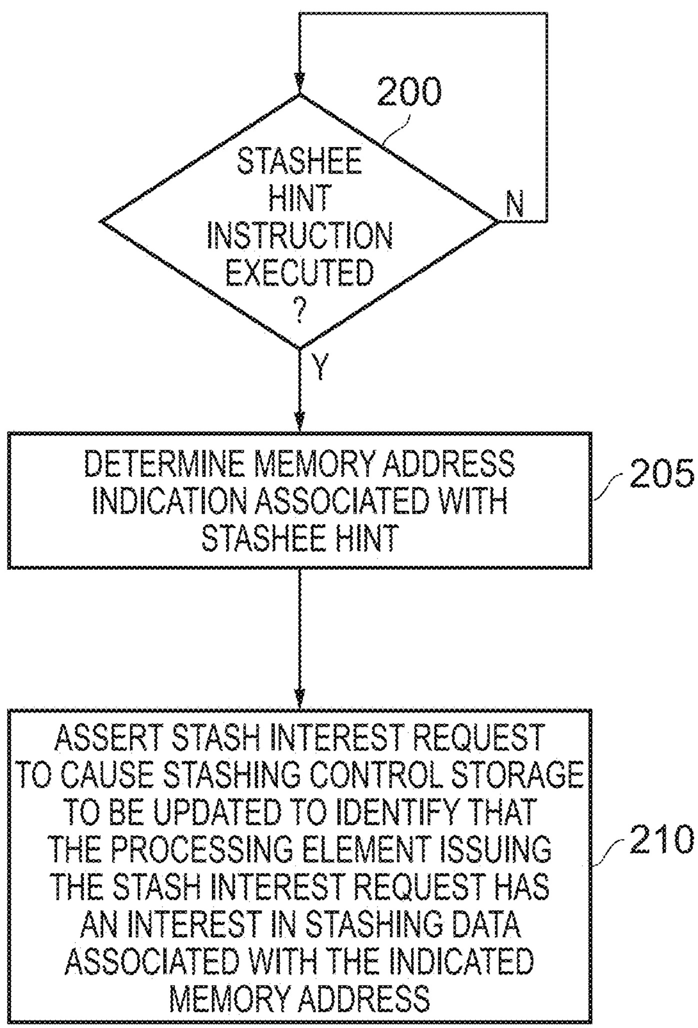
FIG. 5 is a flow diagram illustrating steps that may be performed upon detection of a stashee hint instruction.

As shown in FIG. 5, when a consumer processing element executes a stashee hint instruction at step 200, then at step 205 a memory address indication associated with the stashee hint is determined. This may for example be provided directly by the stashee hint instruction, or the stashee hint instruction may include sufficient information to enable the memory address indication to be determined. Then, at step 210, the consumer processing element is arranged to assert a stash interest request, to cause stashing control storage 60 to be updated to identify that that consumer processing element has an interest in stashing data associated with the indicated memory address. As will be apparent from the earlier discussions, the stashing control circuitry 55 can then reference that stashing control information in due course when updated data for the indicated memory address is being generated, and then issue one or more stashing control signals to the consumer processing element to allow the updated data to be stashed in that consumer processing element's local cache.

FIGS. 6 to 10 are diagrams contrasting the interactions that may occur between components of a system when adopting techniques described herein, and the interactions between those components that may occur without using the techniques described herein. Starting first with FIG. 6, the left-hand side of the figure shows a sequence of interactions 270 between a processing element 250 that wishes to generate updated data (referred to herein as the producer processing element), coherency management circuitry 255 within the interconnect (which can be considered to correspond to the coherency management circuitry 65 shown in FIG. 1, but which may also be referred to herein as a home node (HNF)) and a processing element 260 that may wish to use the updated data (referred to herein as the consumer processing element). This sequence 270 assumes that the hint instructions described herein are not used, and hence is provided for illustration purposes to indicate a series of interactions that may be required when not adopting the techniques described herein. At the start of the sequence 270, it is assumed that the producer processing element 250 is caching a copy of the current data for a given memory address in the shared clean (SC) state and that the consumer processing element is also caching a copy of that data in the SC state. In order for the producer processing element to update the data, then in accordance with the cache coherency protocol employed by the coherency management circuitry 255, the producer processing element needs to obtain a copy of the data in unique state (meaning that no other processing element has a valid cached copy of the data).

To achieve this, as shown by the sequence of interactions 270, the producer processing element 250 may initiate a data update transaction by issuing a "MakeReadUnique" request signal to the home node 255. The home node responds to this request by determining from the snoop filter storage that the consumer processing element 260 currently holds a copy of the data, and accordingly issues a snoop request signal (the "SnpCleanInvalid" signal shown in FIG. 6) to the consumer processing element 260 that causes that processing element to invalidate its copy of the data (as indicated by the "I" state in FIG. 6). Once the data has been invalidated, the consumer processing element 260 issues a snoop response indicating that the data has been invalidated (the "SnpRsp_I" signal shown in FIG. 6). However, because the consumer processing element still has an interest in the data, it may additionally subsequently issue a read request to the home node 255 to seek to obtain the updated data (that read request being indicated by the "ReadShared" signal in FIG. 6).

Once the home node 255 has received the snoop response confirming that the consumer processing element 260 has invalidated its copy of the data (if the snoop filter indicated that more than one consumer processing element had a copy of the data, it would have issued snoop request signals to each of those processing elements, and would at this point wait until it had received the snoop responses from all of the processing elements snooped), the home node will issue a completion signal to the producer processing element confirming that the producer processing element now has the data in the unique clean (UC) state (as indicated by the "Comp_UC" signal FIG. 6), and at this point the producer can store the updated data value in its local cache, changing the state of that data to the unique dirty (UD) state (the dirty designation indicating that the data is more up-to-date than the copy held in memory, and accordingly will need to be propagated to a lower level of the memory hierarchy in due course, for example when the data is evicted from the producer processing element's local cache). At this point, the producer processing element 250 will issue an acknowledgement signal to the home node 255 (the "CompAck" signal shown in FIG. 6).

Given that the home node 255 has received a read request from the consumer processing element 260, it will then issue a snoop request signal to the producer processing element 250 to cause a copy of that data to be provided to the consumer processing element 260. In the example illustrated in FIG. 6, this snoop request signal is referred to as a "SnpSharedFwd" signal and will identify that the producer processing element 250 should provide a copy of the updated data to the consumer processing element 260, that updated data then being provided via the "CompData_SC" signal shown in FIG. 6 (in the example of FIG. 6 it is assumed that the implementation allows the producer processing element to pass the data directly to the consumer processing element through the interconnect fabric). At this point, the producer processing element will change the state of its copy of the data to the shared clean state, as will the consumer processing element 260 when it stores a copy of that data in its local cache. It should be noted that in this example the dirtiness of the data can be tracked by the home node 255, hence why the producer processing element can update the state of its copy to the shared clean state. In an alternative implementation that supports "shared dirty" state, the dirtiness of the data could be tracked by one of the processing elements. Thereafter, as shown in FIG. 6, the consumer processing element 260 can send an acknowledgement back to the home node 255 to confirm that it has received the updated data from the producer processing element 250.

Figure 6:
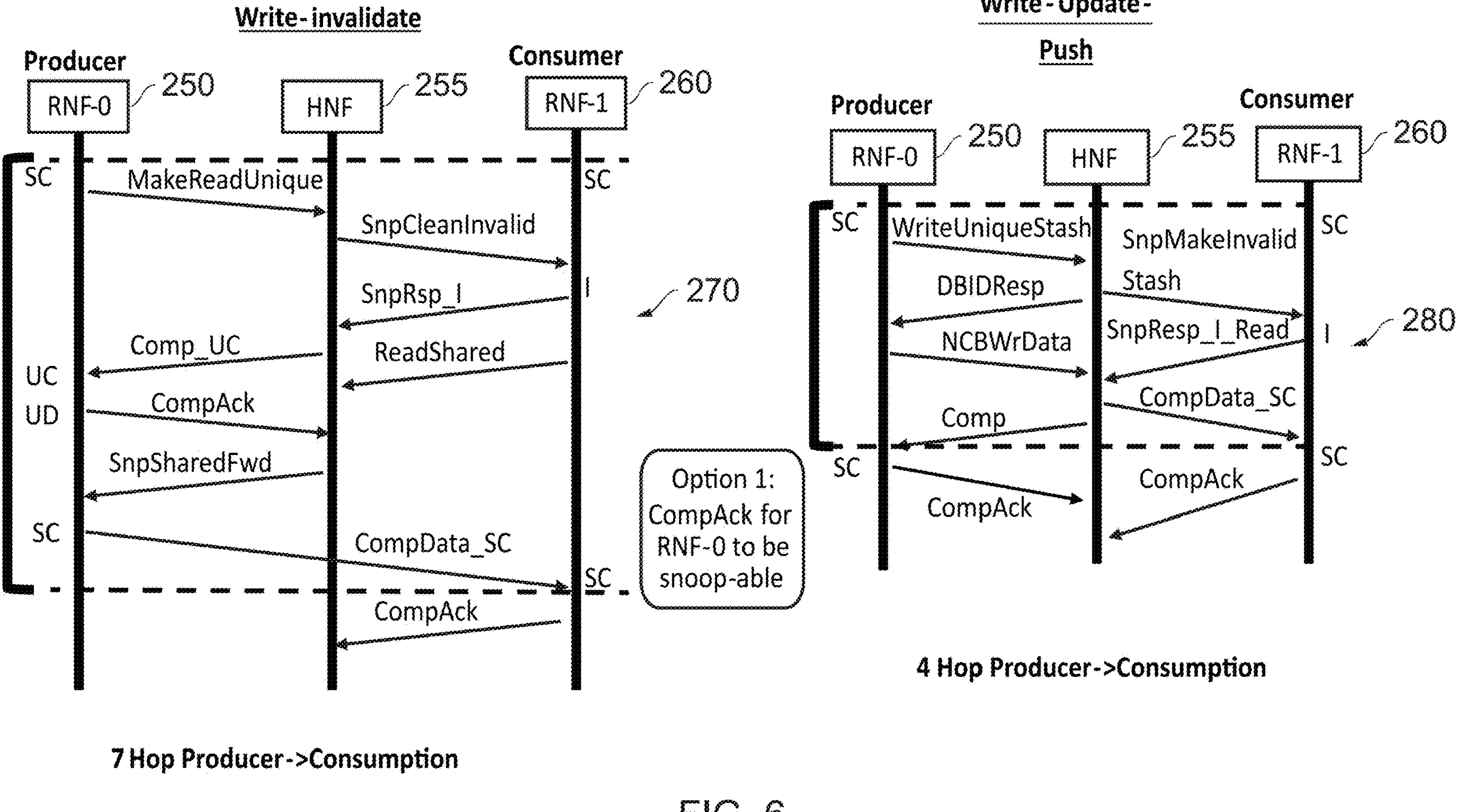
FIGS. 6 to 10 are diagrams contrasting the interactions that may occur between components of a system when adopting techniques described herein, and the interactions between those components that may occur without using the techniques described herein.

The data update transaction initiating the sequence of interactions 270 shown in FIG. 6 may be referred to as a write-invalidate transaction, since an invalidation of any other cached copies of the data is performed before the producer processing element can store updated data in its local cache. As can be seen, the sequence of interactions 270 involves seven hops between the indicated components before the updated data is stored both within the cache of the producer processing element and the cache of the consumer processing element.

The right-hand side of FIG. 6 shows a sequence of interactions 280 that can achieve the same end result, but using techniques described herein. In particular, it is assumed that the producer processing element 250 has executed the earlier mentioned stash hint instruction which has then been associated with the data update instruction, and as a result a modified data update transaction is initiated (which may be referred to herein as a write-update-push transaction). As with the left hand side of FIG. 6, the process starts with both the producer processing element 250 and the consumer processing element 260 caching a copy of the data in the SC state. On determining that a modified data update transaction should be initiated, the producer processing element issues a request signal to the home node 255 (referred to in FIG. 6 as a "WriteUniqueStash" request signal).

As before, the home node 255 is responsive to the request signal to reference the snoop filter storage, and again determines that the consumer processing element 260 holds a copy of the data. However, due to the different form of request it has now received, it issues a snoop request signal of a slightly different form to the consumer processing element 260, referred to in FIG. 6 as a "SnpMakeInvalidStash" snoop request signal. This causes the consumer processing element 260 to invalidate its local copy of the data, and also gives the consumer processing element the opportunity to stash the updated data. Once the data has been invalidated, the consumer processing element 260 issues a snoop response indicating that the data has been invalidated and, assuming it wishes to also stash a copy of the updated data, flags in that snoop response that it wishes to receive the updated data (in FIG. 6 this is indicated by the "read" suffix in the "SnpResp_I_Read" response signal).

Meanwhile, the home node 255 may also have responded to the request signal from the producer element 250 by issuing a response to the producer element (indicated in FIG. 6 as the "DBIDResp" signal) asking it to provide a copy of the updated data, and this causes the producer 250 to return a copy of the updated data (indicated in FIG. 6 by the "NCBWrData" signal).

Hence, on receiving the snoop response with an indication that the consumer element 260 wishes to stash the data, the home node 255 can provide a completion signal to the consumer processing element 260 that includes the updated data (indicated in FIG. 6 by the "CompData_SC" signal), this causing the consumer processing element 260 to store the updated data in its cache in the shared clean state. In addition, the home node 255 can issue a completion signal to the producer processing element 250 indicating that the producer processing element can store the updated data in the shared clean state in its local cache. Both the producer processing element 250 and the consumer processing element 260 can then issue acknowledgement signals back to the home node 255 to confirm that the updated data has been stored in their local caches. In the example implementation shown in FIG. 6, the home node 255 uses the acknowledgement signals to determine when it is able to send any subsequent snoop requests to the associated processing elements in respect of the memory location that has been the subject of the write-update-push transaction. Hence, for example, the home node 255 will determine when it receives the acknowledgement signal from the producer element 250 (the CompAck signal shown in FIG. 6) that the producer processing element 250 is now available to receive a subsequent snoop request as and when required.

As will be apparent from a comparison of the sequence of interactions 280 with the sequence of interactions 270, when using the techniques described herein the number of hops can be significantly reduced. In particular, the sequence of interactions 280 involves only four hops between the indicated components before the updated data is stored both within the cache of the producer processing element and the cache of the consumer processing element (compared with the seven hops that was required when using the sequence of interactions 270).

It should be noted that the hops being referred to above are logical hops, and the actual number of physical hops within the interconnect circuitry may be dependent on the topology used for the interconnect. For example, assuming a coherent mesh network (CMN) is used, each logical hop may involve multiple CMN link hops between the nodes of the mesh network.

Figure 7:
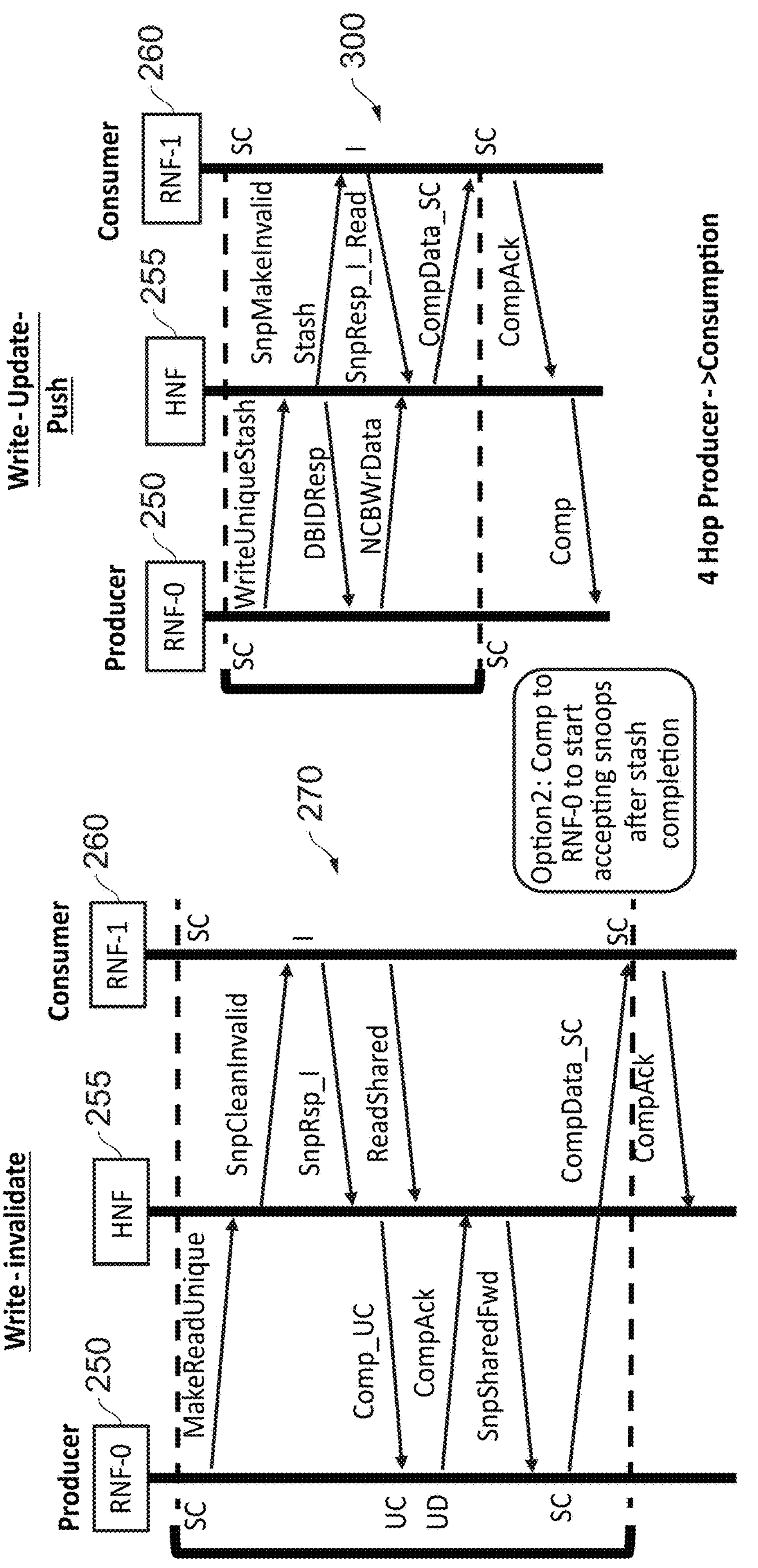

FIG. 7 illustrates a slightly modified sequence of interactions 300 that may be used to perform the write-update-push transaction in accordance with one example implementation. The left hand sequence 270 is exactly the same in FIG. 7 as in FIG. 6, but the right hand sequence 300 in FIG. 7 differs from the right hand sequence 280 in FIG. 6 in that the completion signal is not issued from the home node 255 to the producer processing element 250 until the acknowledgement signal (the CompAck signal) has been received by the home node 255 from the consumer processing element 260. The provision of the completion signal to the producer processing element 250 then indicates that the producer processing element can begin processing subsequent snoop requests in respect of the memory location that has been the subject of the write-update-push transaction.

Figure 8:
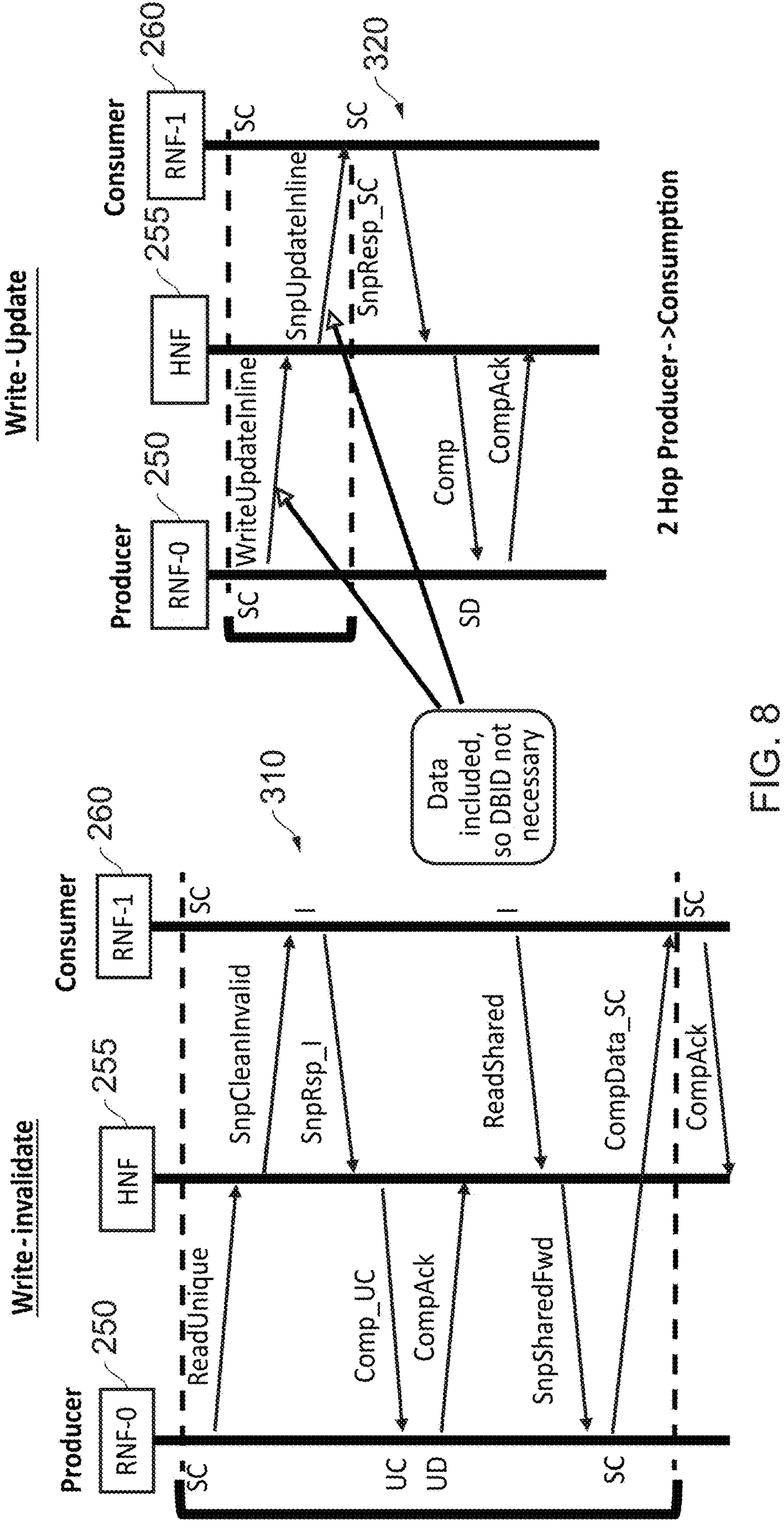

FIG. 8 schematically illustrates an alternative form of modified data update transaction that may be implemented in one example. Again a write-invalidate sequence (not using the techniques described herein) is shown on the left hand side of the figure for comparison, the sequence of interactions 310 differing from the sequence of interactions 270 shown in FIGS. 6 and 7 merely in the timing of the "ReadShared" signal issued by the consumer processing element 260. In particular, the timing of that request to read the data is not significant, and can come after the CompAck signal received from the producer processing element to confirm that the updated data has been stored in the producer processing element's local cache in the UD state (as shown in FIG. 8) or before receipt of that CompAck signal (as shown in FIGS. 6 and 7).

In the example shown in the right hand side of FIG. 8, it is assumed that the modified data update transaction seeks to perform an inline update of the data within the local cache of consumer processing element 260. In particular, in response to execution of the earlier mentioned stash hint instruction in association with the subsequent data update instruction, the producer processing element 250 initiates the modified data update transaction by issuing a WriteUpdateInline request to the home node 255. In this example, it is assumed that that request includes the updated data, and hence there is no need for the DBID response used in the sequences 280, 300 discussed earlier. Again, the home node 255 determines that the consumer processing element 260 has a cached copy of the data, and issues a snoop request signal to the consumer processing element 260 which also provides the updated data and indicates that an inline update of the data in the consumer processing element's cache should take place, thereby causing the updated data to be stashed within the consumer processing element's cache.

Accordingly, the consumer processing element 260 responds to this snoop request signal by updating its local copy of the data to reflect the updated data provided in this snoop request, and then issues a snoop response confirming that the updated data has been stored in the shared clean state. Once the home node 255 receives that snoop response, it then issues a completion signal to the producer processing element 250, which in this case causes the producer processing element 250 to store the updated data in its local cache in the shared dirty (SD) state, whereafter an acknowledgement signal is issued back to the home node 255. By appending the updated data to the original request issued by the producer element 250, such an approach can further reduce the round-trip latency.

In the example shown in FIG. 8, it is assumed that the producer processing element 250 supports storing of the updated data in the shared dirty state. If that is not the case, then as with the earlier examples the producer processing element may store the updated data in the shared clean state, and the home node can be arranged to obtain a copy of the updated data (typically the entire cache line containing the updated data) using a DBID or SnpResp signal, and can track the dirtiness of that data within its local storage structures (for example the earlier mentioned snoop filter storage) to enable the updated data to be written back to memory later (or indeed during the processing of the write update transaction).

Figure 9:
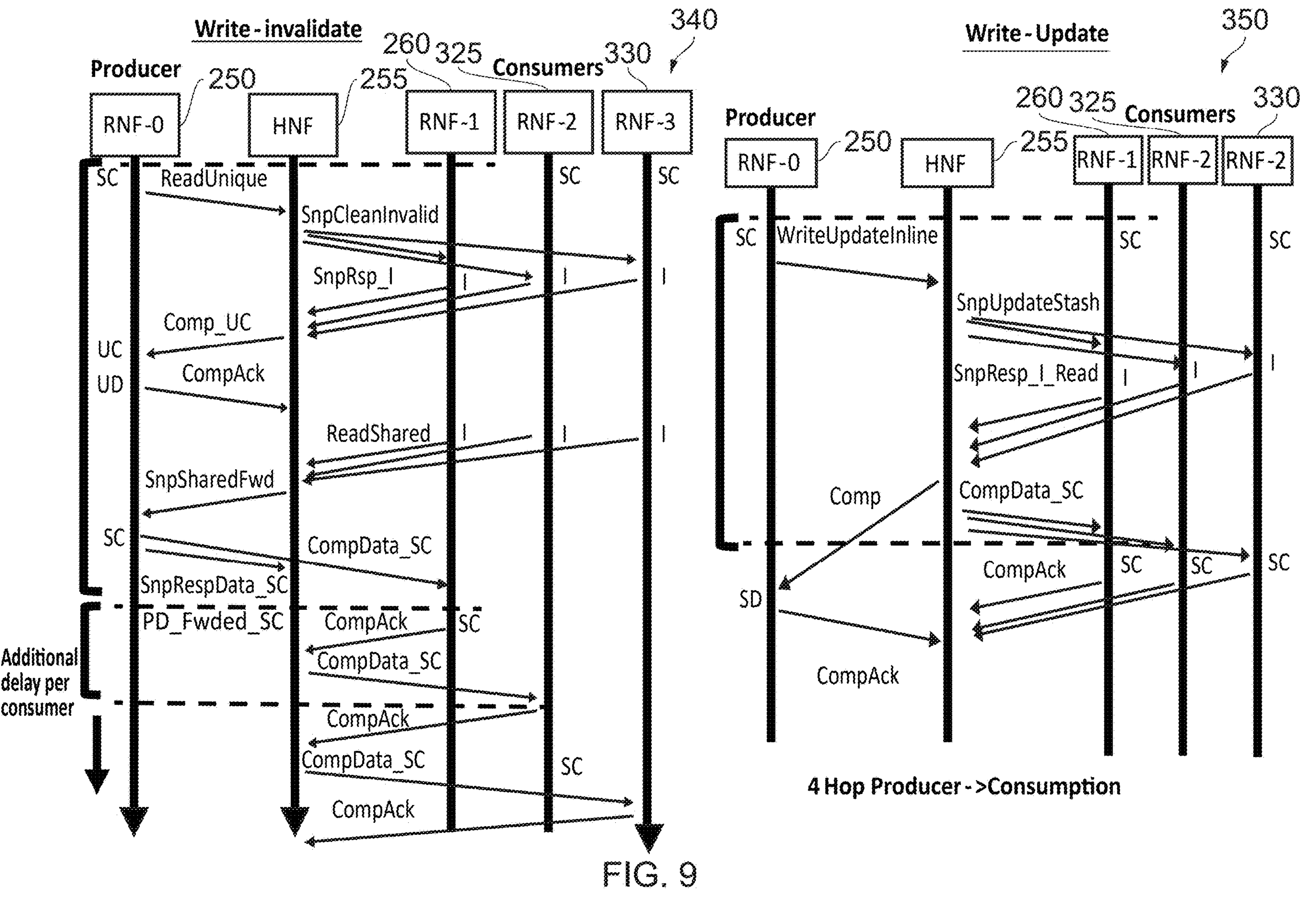

FIG. 9 shows a variant of the FIG. 8 approach, in situations where the home node determines that there are multiple consumer processing elements that have cached copies of the data in question. The sequence 340 on the left-hand side of FIG. 9 shows the write-invalidate process that would be performed, i.e. in the absence of the techniques described herein. As is shown, snoop requests will be issued to each of the consumer processing elements 260, 325, 330, and separate invalidate responses will be received, along with separate requests to re-read the data. The updated data will then be provided (in the example shown this is done sequentially) to each of the consumer processing elements 260, 325, 330. When the producer processing element 250 provides the updated data to the first consumer processing element 260, it will also send a snoop response with the updated data to the home node 255, so that the home node 255 can subsequently handle the forwarding of the updated data to the other consumer processing elements 325, 330 in due course. This snoop response is labelled "SnpRespData_SC_PD_Fwded_SC" to indicate that the producer RNF_0 has the data in the shared clean (SC) state, and that it has passed dirty (PD) to the home node, whilst also informing the home node that the data was forwarded directly to the consumer RNF-1 in the SC state.

When using the techniques described herein, the number of hops can be significantly reduced using the inline update approach, since the home node 255 is provided with the updated data as part of the original request issued by the producer processing element 250. However, as shown by the sequence 350 on the right-hand side of FIG. 9, in order to ensure coherency of the data is maintained, an inline update cannot be performed within each of the consumers, and instead each of the consumers receives a snoop request (the SnpUpdateStash" request shown in FIG. 9) requiring it to invalidate its local copy of the data, but identifying that the updated data will be available for stashing. Assuming each of the snoop responses from the consumer processing elements 260, 325, 330 indicates not only that the data has been invalidated in the local caches, but also indicates that stashing of the updated data is desired (as discussed earlier with reference to FIG. 6, this is indicated by the "read" suffix in the snoop response), then the home node 255 can provide the updated data to each of the consumer processing elements 260, 325, 330 (as indicated by the "CompData_SC" signals within the sequence 350 of FIG. 9). This will cause each of the consumer processing elements 260, 325, 330 to store the updated data in their local caches in the shared clean state, and to issue acknowledgements back to the home node 255 when that has been done. In addition, the home node 255 will also issue a completion signal to the producer processing element 250 to enable the producer processing element to store the updated data in its local cache in the shared dirty state, with the producer processing element 250 then issuing an acknowledgement signal in the same way as discussed earlier with reference to FIG. 8.

As noted above, if there are multiple consumer processing elements that have cached copies of the data, then as shown in FIG. 9 those copies need to be invalidated first in order to satisfy memory consistency, and as will be apparent from a comparison of the sequence 350 of FIG. 9 with the sequence 320 of FIG. 8, this adds two more hops than would be required if there is only a single consumer processing element caching a copy of the data and hence the inline update process of FIG. 8 could be performed.

Figure 10:
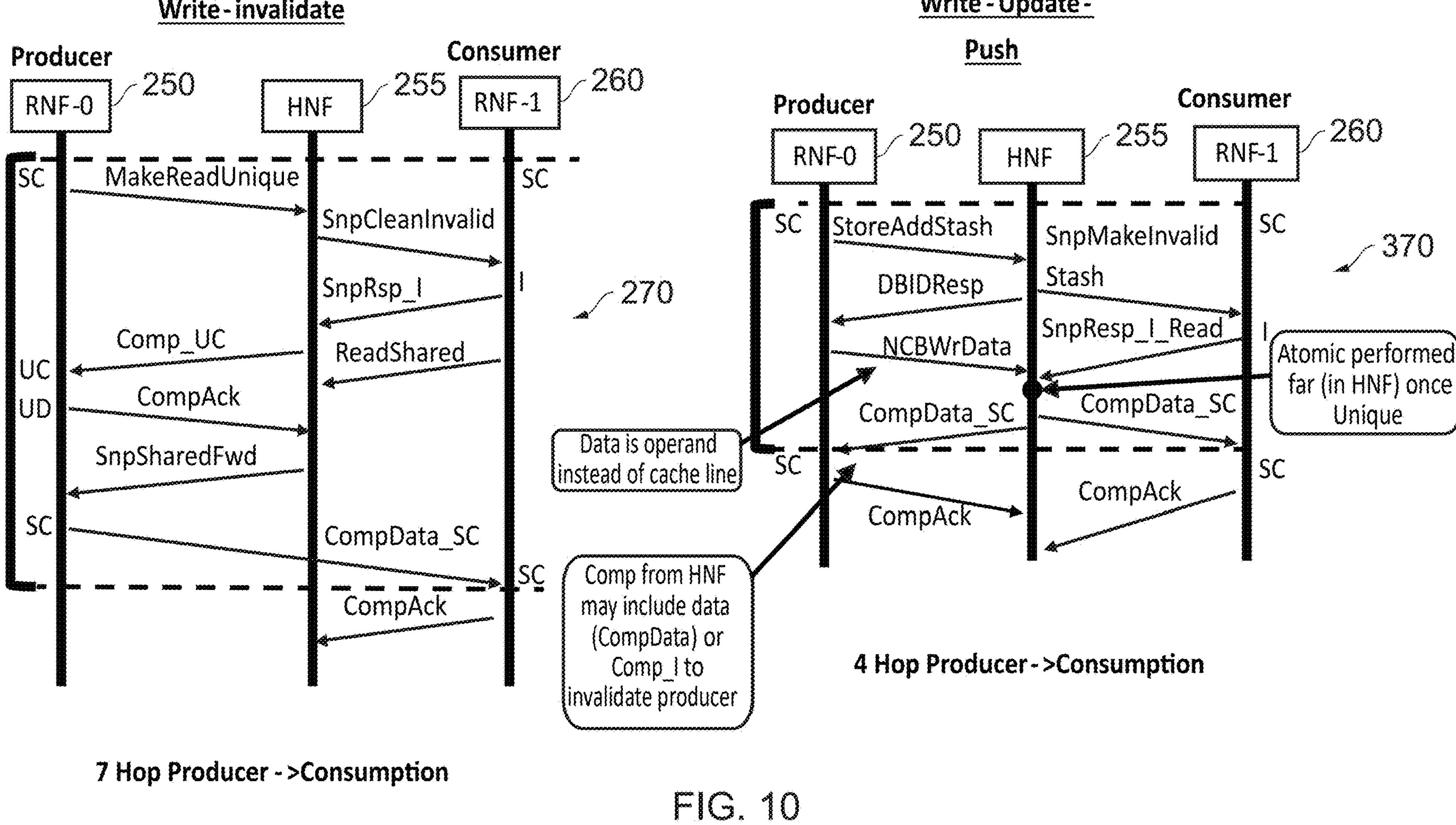

Whilst in the earlier examples it is assumed that it is the producer processing element 250 that is generating the updated data, this is not a requirement, and instead the modified data update transaction initiated by the producer processing element 250 may specify an atomic update operation requiring the home node 255 to generate the updated data from one or more source operands provided for the modified data update transaction. Such an approach is shown in FIG. 10. For comparison, the earlier described write-invalidate sequence 270 is shown on the left-hand side of FIG. 10.

As shown by the sequence 370 on the right-hand side of FIG. 10, when it is determined that an atomic operation is required, the producer processing element 250 may initiate the required modified data update transaction by issuing a particular form of request referred to in FIG. 10 is a "StoreAddStash" request. This indicates that the home node is required to perform an addition operation to generate the updated data to then be stored, and should also make the updated data available for stashing. In the same way as discussed previously, the home node 255 will then determine that the consumer processing element 260 has a copy of the data, and will issue a snoop request signal of the same form as discussed earlier with reference to FIG. 6, to cause the consumer processing element to invalidate its local copy, but if desired to indicate that it wishes to stash the updated data. In the same way as discussed earlier with reference to the sequence 280 of FIG. 6, the consumer processing element 260 will issue a snoop response when it has invalidated the data, and may add the "read" suffix to indicate that it wishes to stash the updated data.

In addition, the home node 255 may issue a "DBIDResp" signal to the producer processing element 250, but in contrast to the sequence 280 FIG. 6, since an atomic operation is being performed here, the data that the producer processing element 250 provides in the subsequent "NCBWrData" signal is the operand data to be used to generate the updated data rather than the updated data for the cache line in question.

Once the home node 255 has received that source operand data, and also has received the snoop response from the consumer processing element 260 confirming that the consumer's copy of the data has been invalidated, it can then perform the atomic operation (which may be referred to as a "far" atomic operation because the operation is performed at a remote location from the producer processing element, in particular at the home node) in order to generate the updated data. Once the updated data has been generated, both the original and updated data can then be provided back to the producer processing element 250 (via the CompData_SC signal) to cause the producer processing element 250 to store the updated data in the shared clean state in its local cache, and can also be provided to the consumer processing element 260 (via the CompData_SC" signal) to cause the consumer processing element to stash the updated data in its local cache in the shared clean state. As discussed earlier with reference to FIG. 6, both the producer processing element 250 and the consumer processing element 260 may then issue acknowledgement signals back to the home node 255 to confirm that their locally cached copies have been updated.

As noted in FIG. 10, whilst the CompData_SC signal issued from the home node 255 to the producer processing element 250 may include the updated data, it could alternatively take the form of a completion invalidate signal used to invalidate the producer processing element's cached copy of the data (if for example it is determined that the producer processing element does not need a cached copy of the updated data). In that event, the provision of the data to the consumer processing element 260 may cause the consumer processing element to store the updated data in its local cache in a unique state (in one example this could be the unique dirty state so that the home node does not need to cache the data).

In the example of FIG. 10, it is assumed that the atomic operation required is an STADD operation, and hence a StoreAddStash request is issued, but it will be appreciated that the same technique could be applied for a variety of atomic operations that can be executed in a far manner (i.e. with the resultant updated data being generated by the home node).

The data that may be stashed using the techniques described herein can take a wide variety of different forms, and merely by way of example could take the form of synchronisation variables, locks, data used in message queues, inter-core work queues, etc. There are many situations where such data needs to be shared between threads. For example, synchronisation and communication operations using such data appear frequently in many parallel computing applications.

The data update transactions issued over the interconnect may typically relate to an address aligned block of data of a given block size. The block size may vary dependent on implementation, but in one example implementation may be the size of a cache line, so that up to a cache line's worth of data can be specified within a transaction issued over the interconnect. However, the individual store instructions executed by the processing circuitry may relate to smaller sized items of data, and as discussed earlier processing elements often use merge buffers to enable merging of items of data generated by executing a series of store instructions that all relate to the same address aligned block. This can significantly improve efficiency by reducing the number of transactions issued on the interconnect, and indeed the number of accesses made to the processing element's local cache. Often, the data may be retained within the merge buffer until it is necessary to output some of the data from the merge buffer to make room for new data, or until some synchronisation event occurs that requires data to be flushed from the merge buffer.

Whilst the above approach can lead to significantly improved bandwidth utilisation within the system, it can lead to some issues when handling data that has been flagged as to be made available for stashing within a storage structure (e.g. cache) accessible to another processing element (the stashee), for example in that stashee's level 1 cache. In such situations, it is useful to reduce the latency associated with the provision of that data for stashing in the stashee's cache, which might imply that the data should not be held within the merge buffer but instead should be issued straightaway. However, this can give rise to an overall increase in latency, for example in situations where multiple items of updated data relating to the same address aligned block, each of which are to be made available for stashing, are generated by a series of store instructions. If a transaction for the first item of updated data is issued onto the interconnect as soon as possible with the aim of making that data available for stashing at the earliest possible time, then this could significantly impact the latency associated with the later generated items of data since it may not be possible to issue a transaction relating to those items of data until an acknowledgement has been received from the interconnect circuitry for the first issued item of updated data.

As discussed herein, these problems can be alleviated by enabling a merging window to be opened in relation to a given address aligned block, for example when a first item of updated data is generated relating to that given address aligned block. In the event that at least one or more items of updated data relating to that given address aligned block are determined to be data that should be made available for stashing, the processing circuitry can then be arranged to be responsive to a stashing specific merge end trigger to determine that the merging window should be closed, at which point a merged data update stashing transaction can be issued to the interconnect circuitry specifying the merged updated data collated within the merge buffer whilst the merging window was open. By allowing one or more items of updated data that are to be made available for stashing to be merged within the merge buffer until the stashing specific merge end trigger is detected, before then issuing a single stashing transaction specifying that updated data, this can enable more efficient use of the available bandwidth of the interconnect circuitry. Further, it can reduce the overall latency associated with stashing the updated data specified by a series of store instructions.

As mentioned earlier, in some instances the processing hardware, when merging updated data within the merge buffer for a given address aligned block in situations where that data is to be made available for stashing, may be able to detect situations that indicate presence of the stashing specific merge end trigger. This could for example happen where the updated data to be made available for stashing fills the entire given address aligned block, and/or where the updated data to be made available for stashing, at least when a given update pattern is present, reaches a block boundary of the given address aligned block. However, in the more general case, it can be difficult for the processing hardware to detect when it is no longer going to be useful to keep the merging window open in relation to a series of data updates that are to be made available for stashing. In particular, it will not typically be known by the hardware whether there are likely to be any additional data updates to be merged into the relevant address aligned block. In accordance with one example implementation described herein, a mechanism is provided that avoids the need to rely on the hardware detecting when to raise the stashing specific merge end trigger. In particular, this is achieved through the use of a merge end hint instruction that can be added into a sequence of instructions to indicate when it is appropriate to raise the stashing specific merge end trigger. The provision of such a merge end hint instruction enables a programmer, library or compiler to indicate when it would be appropriate to close the merging window that had been opened to allow merging of one or more items of updated data that are to be made available for stashing. This hence enables a software hint to be provided to the hardware, avoiding the merging window from being maintained open beyond the point where it is useful, which can result in significantly reduced latency and improved throughput in a data processing system.

Figure 11:
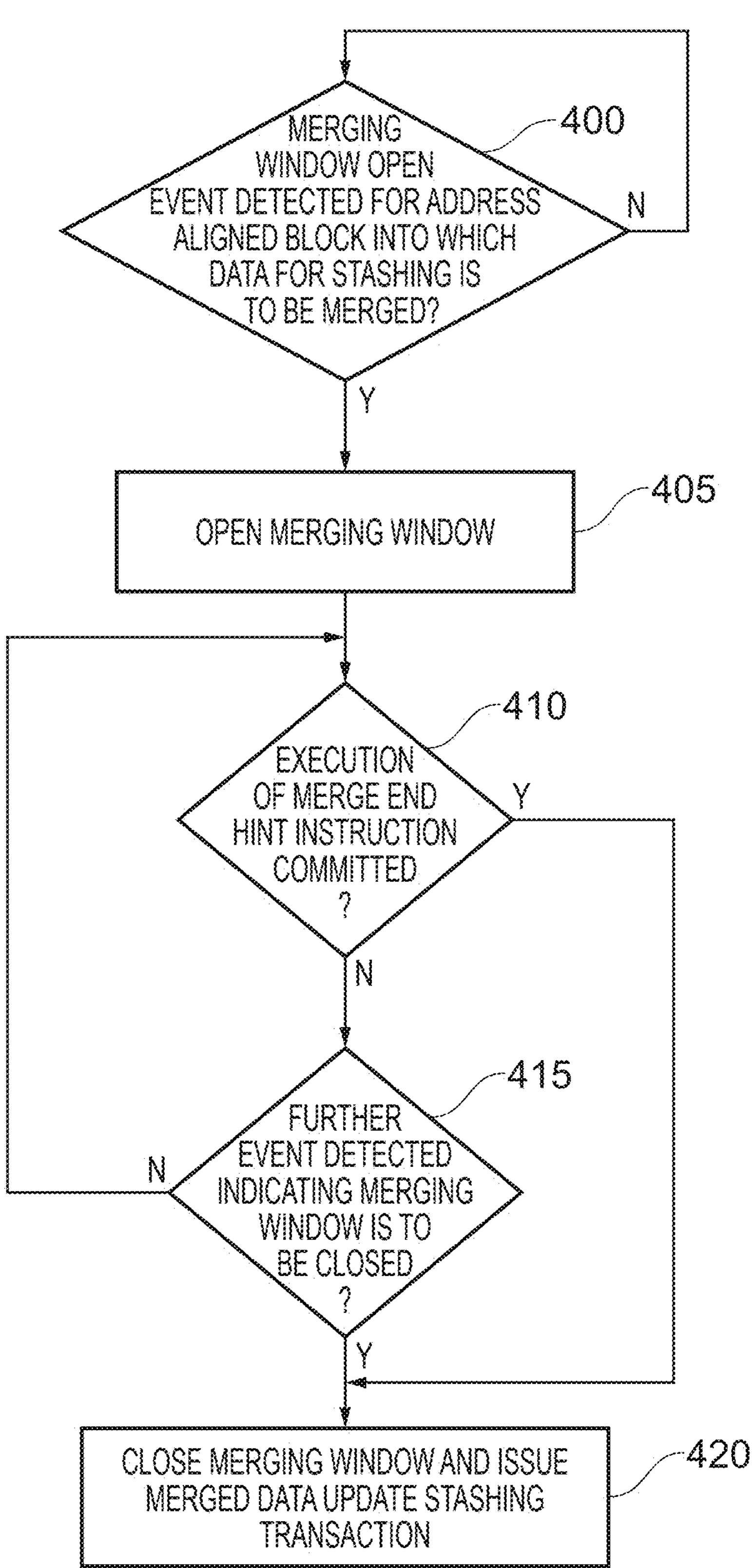
FIG. 11 is a flow diagram illustrating steps that may be performed in one example implementation to control the duration of a merging window used in association with an address aligned block of data into which updated data to be made available for stashing is merged.

FIG. 11 is a flow diagram illustrating steps that may be performed in one example implementation to control the duration of a merging window used in association with an address aligned block of data into which updated data to be made available for stashing is merged, within a system where use of the above-mentioned merge end hint instruction is supported. At step 400 it is determined whether a merging window open event has been detected for an address aligned block into which data for stashing is to be merged. The merging window open event can take a variety of forms, but in one example implementation this event may be detected when a first store instruction relating to a given address aligned block is executed, and hence the merging window is not yet open for that given address aligned block. When subsequent store instructions are encountered that are generating data to be merged into the same given address aligned block, then the generated data is merely merged into the block without opening another merging window (i.e. there will typically be only one active merging window for each address aligned block being processed by the merge buffer). For the purposes of the description of FIG. 11, it is assumed that the data being merged into the given address aligned block has been determined as data to be made available for stashing, but a merging window will typically be opened whenever updated data is generated for an address aligned block that does not currently have an active merging window open. It should also be noted that whilst the first store instruction may be identified as relating to updated data to be stashed, this is not a requirement, and it may in fact only be identified that the given address aligned block includes updated data that is to be made available for stashing at a later point in time, for example in association with one of the later executed store instructions.

Once is determined at step 400 that the merging window open event has been detected for an address aligned block into which data for stashing is to be merged, then at step 405 the merging window is opened. Thereafter, at step 410, it is determined whether execution of a merge end hint instruction within the sequence of instructions has been committed. Once execution of a merge end hint instruction has reached the commit point within the processing pipeline, then it will be the case that all of the relevant preceding store instructions in program order will have been executed, and the generated data added to the merge buffer.

If it is determined at step 410 that execution of a merge end hint instruction has been committed, then the process proceeds to step 420 where the merging window is closed, and the processing circuitry is arranged to issue a merged data update stashing transaction containing the merged updated data collated within the given address aligned block whilst the associated merging window was open.

It should be noted that whilst in one use case it is expected that the merge end hint instruction will be included within the program in association with a given sequence of store instructions providing updated data for stashing that will be merged by the merge buffer within the same address aligned block, in some implementations a single instance of the merge end hint instruction may apply generically to any preceding store instructions in program order whose generated updated data is for stashing and is still contained within an address aligned block in the merge buffer whose associated merging window is still open, and hence potentially to data contained within more than one address aligned block. Alternatively, the merge end hint instruction may include a parameter identifying an address range of data to which the merge end hint instruction applies.

If at step 410, it is determined that a merge end hint instruction has not been executed, or at least execution of such a merge end hint instruction has not reached the commit stage of the pipeline, then the process will proceed to step 415 where it will be determined whether any further events have been detected that indicate that the merging window should be closed. As discussed earlier, it is possible that the processing circuitry may be able to detect certain events, other than execution of the merge end hint instruction, that indicate the presence of the earlier-mentioned stashing specific merge end trigger. In addition, other events not specifically associated with updated data being made available for stashing may also cause the merging window to be closed. For example, if a fullness threshold of the merge buffer is reached, the merge buffer may need to issue one or more transactions containing updated data, in order to free up space within the merge buffer to receive new data. This may cause the merging window to be closed in association with an address aligned block into which data for stashing is being merged, although as will be discussed later with reference to FIG. 16 in one example implementation it may be possible to prioritise for retention within the merge buffer an address aligned block containing data to be made available for stashing, if that is considered appropriate. As another example, certain synchronisation events may require the contents of the merge buffer to be flushed, at which point the above-mentioned merged data update stashing transaction may be issued containing the merged data for the given address aligned block.

If no further event is detected at step 415, then the process returns to step 410, and steps 410 and 415 are repeated until it is determined that the merging window should be closed. Whilst the merging window is open, then additional updated data generated by execution of any further store instruction will be merged within the given address aligned block provided the address of the updated data falls within the address range of the address aligned block.

FIGS. 12 to 15 are diagrams contrasting the interactions that may occur between components of the system when employing the merge end hint instruction described herein, and the interactions between those components that may occur without using such a merge end hint instruction. Starting first with FIG. 12, the left-hand side of the figure shows a sequence of interactions 450 between a processing element 430 (referred to herein as the producer processing element), coherency management circuitry 435 within the interconnect (referred to in the figure as a home node (HNF)), and a processing element 440 that may wish to use the updated data (referred to herein as the consumer processing element). In the figure, the earlier discussed stash hint instructions are referred to as STSHH STRM instructions, the "STRM" suffix indicating that the producer is not required to cache a copy of the updated data generated by the associated store (STR) instructions. As shown, each stash hint instruction has an associated store instruction, and each store instruction generates four bytes (a data word) of data for consecutive addresses within a given address aligned block. In the illustrated example, it is assumed that a cache line is 64 bytes in length and hence the sequence of store instructions shown in the figure produce updated data for a part of a cache line.

Figure 12:
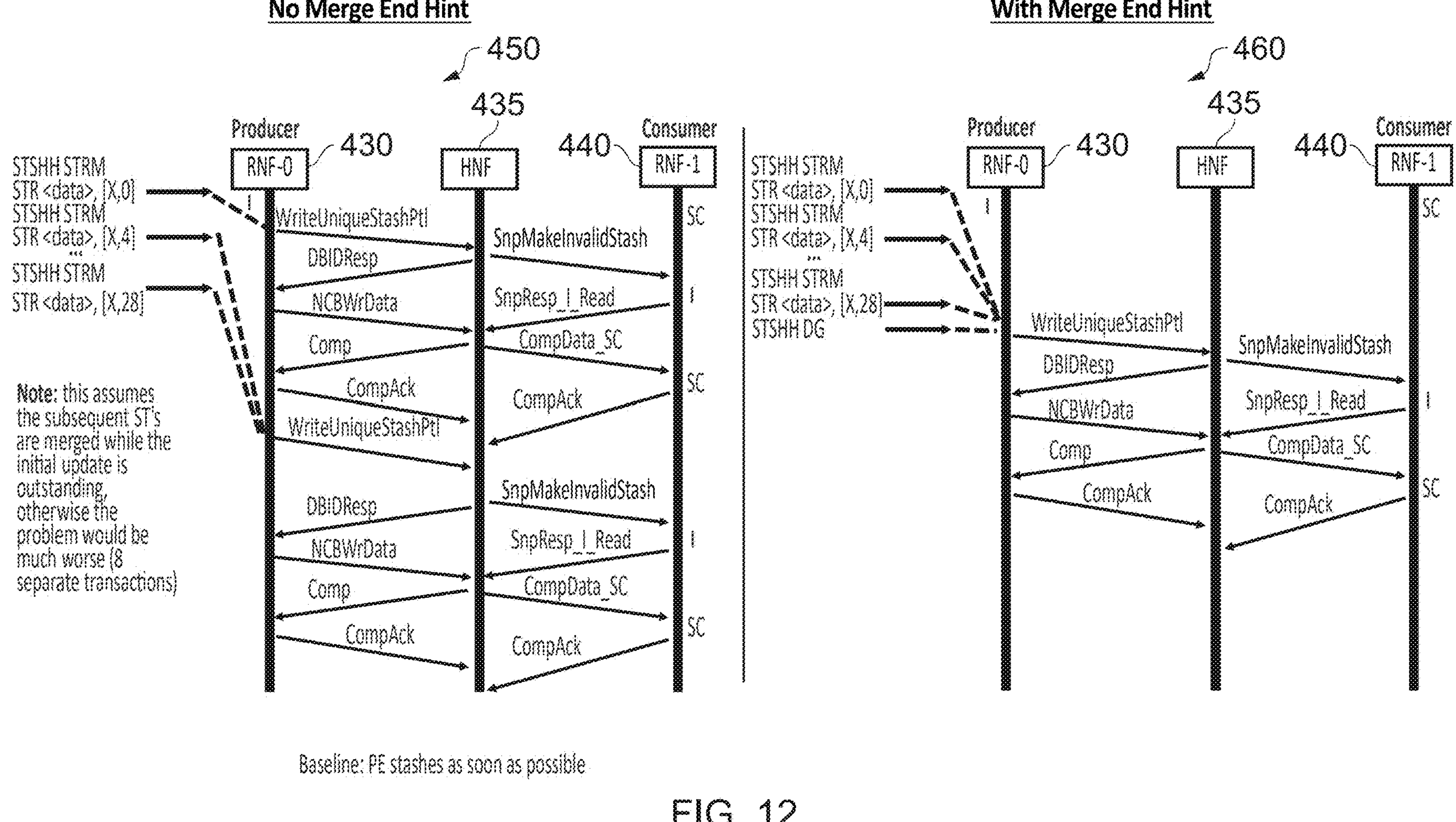
FIGS. 12 to 15 are diagrams contrasting the interactions that may occur between components of the system when employing the merge end hint instruction described herein, and the interactions between those components that may occur without using such a merge end hint instruction.

In the example shown in the left-hand side of FIG. 12, it is assumed that when the first store instruction is executed, then because it is known that the data being generated is to be made available for stashing, it is decided to output that data within a stashing transaction (referred to in the earlier discussions of FIGS. 6 to 10 as a modified data update transaction (due to the stash hint instruction modifying how the subsequent store instruction is interpreted) or as a write-update-push transaction). Since the stash hint instruction is of the "STRM" type, indicating that the producer 430 is not required to retain a copy of the updated data, the producer 430 will invalidate its cached copy of the relevant data (as indicated by the "I" state in FIG. 12) if at that point it had a valid copy of the relevant data cached.

As will be apparent from a comparison of the left-hand side of FIG. 12 with the right-hand side of FIG. 6, the sequence of interactions are very similar. In particular, the producer processing element 430 issues a "WriteUniqueStashPtl" request signal to the home node 435 (the "Ptl" suffix indicating that the request relates to only a part of a cache line, whereas in the right-hand side of FIG. 6 it was assumed that the request related to an entire cache line). The sequence of interactions then takes the same form as discussed earlier with reference to the right-hand side of FIG. 6, resulting in a copy of the updated data item produced by the first store instruction being provided to the home node via the NCBWrData signal, a completion ("comp") signal being issued from the home node 435 to the producer 430 and a completion signal including the updated data (the CompData_SC" signal) being issued from the home node 435 to the consumer 440, this causing the consumer 440 to store the updated data in its cache in the shared clean state. As shown, both the producer 430 and the consumer 440 will then issue acknowledgement signals back to the home node. In one example implementation, it is the home node's responsibility to either cache a dirty copy of the cache line in the system cache 75, or to write the updated cache line contents back to memory in cases where the dirty state is not being tracked at any of the processing elements' caches.

Until the producer 430 has received the completion signal from the home node and provided its acknowledgement back to the home node, it is not able to assert another transaction for the same cache line. Hence, all of the updated data generated by the other store instructions shown need to be buffered until the previously issued transaction has completed. Only then can the producer 430 issue a further "WriteUniqueStashPtl" request in relation to the other merged updated data for the cache line. The same sequence of interactions is then repeated again, resulting in the consumer 440 being provided with a stashed copy of the updated data.

It should be noted that in the example of the left-hand side of FIG. 12, it is assumed that the updated data generated by the second and subsequent store instructions can be merged while the initial transaction in relation to the first item of updated data is being processed, but it will be appreciated that if that is not possible then the latency becomes significantly worse, requiring eight separate transactions in order to propagate the eight items of updated data for stashing in the consumer 440.

The figure in the right-hand side of FIG. 12 illustrates the corresponding sequence of interactions that may take place when adopting the techniques described herein, and in particular when using the earlier described merge end hint instruction. As shown in FIG. 12, it is assumed that the same sequence of instructions is executed by the producer 430, but at the end of that sequence a merge end hint instruction is executed (referred to in the figure as an STSHH DG instruction). When the first stash hint and associated store instruction pair are executed, then a merging window is opened for the associated address aligned block (i.e. the associated cache line) and as each subsequent store instruction is executed, the updated data is merged into the address aligned block within the merge buffer. The merging window is kept open until execution of the merge end hint instruction is committed, at which point the merging window is closed, and a merged data update stashing transaction is issued. The merged data update stashing transaction is initiated by the "WriteUniqueStashPtl" request but this time the request relates to the entirety of the merged updated data and hence it is the entirety of that data that will in due course be provided from the producer 430 to the home node 435 via the NCBWrData signal. As can be seen by a comparison of the right-hand side of FIG. 12 with the left-hand side FIG. 12, the same sequence of interactions take place, but only a single transaction needs to be issued, rather than the two transactions shown in the left-hand side of FIG. 12. Accordingly, the overall latency associated with making the updated data available for stashing within the consumer 440 is significantly reduced when adopting the use of the merge end hint instruction described herein.

In the example of FIG. 12 it is assumed that at the start of the sequence the consumer 440 has the data for the relevant cache line in the shared clean (SC) state indicating that in the past the cache line was shared by multiple processing elements (RNFs), and as noted earlier if the producer 430 had a copy of the data for the relevant cache line it would invalidate its copy as the stash being performed is of the STRM type. It should be further noted that, in the example shown in FIG. 12, at the end of the sequence shown the consumer 440 holds an updated copy of the cache line data in the shared clean (SC) state. However, if at the time of the stash process being performed the home node 435 determines that the consumer will then be the only processing element with a copy of the updated data, it can instead, if desired, cause the consumer 440 to hold the updated data in the unique clean (UC) state, or even in the unique dirty (UD) state if the implementation allows tracking of the dirty state at a processing element's cache. In instances when the cache line data has been updated but no processing element holds the updated data in shared dirty (SD) or unique dirty (UD) state, then in one example implementation it is the home node's responsibility to write the updated data back to memory, or hold a copy of the updated cache line data in its local cache.

Figure 13:
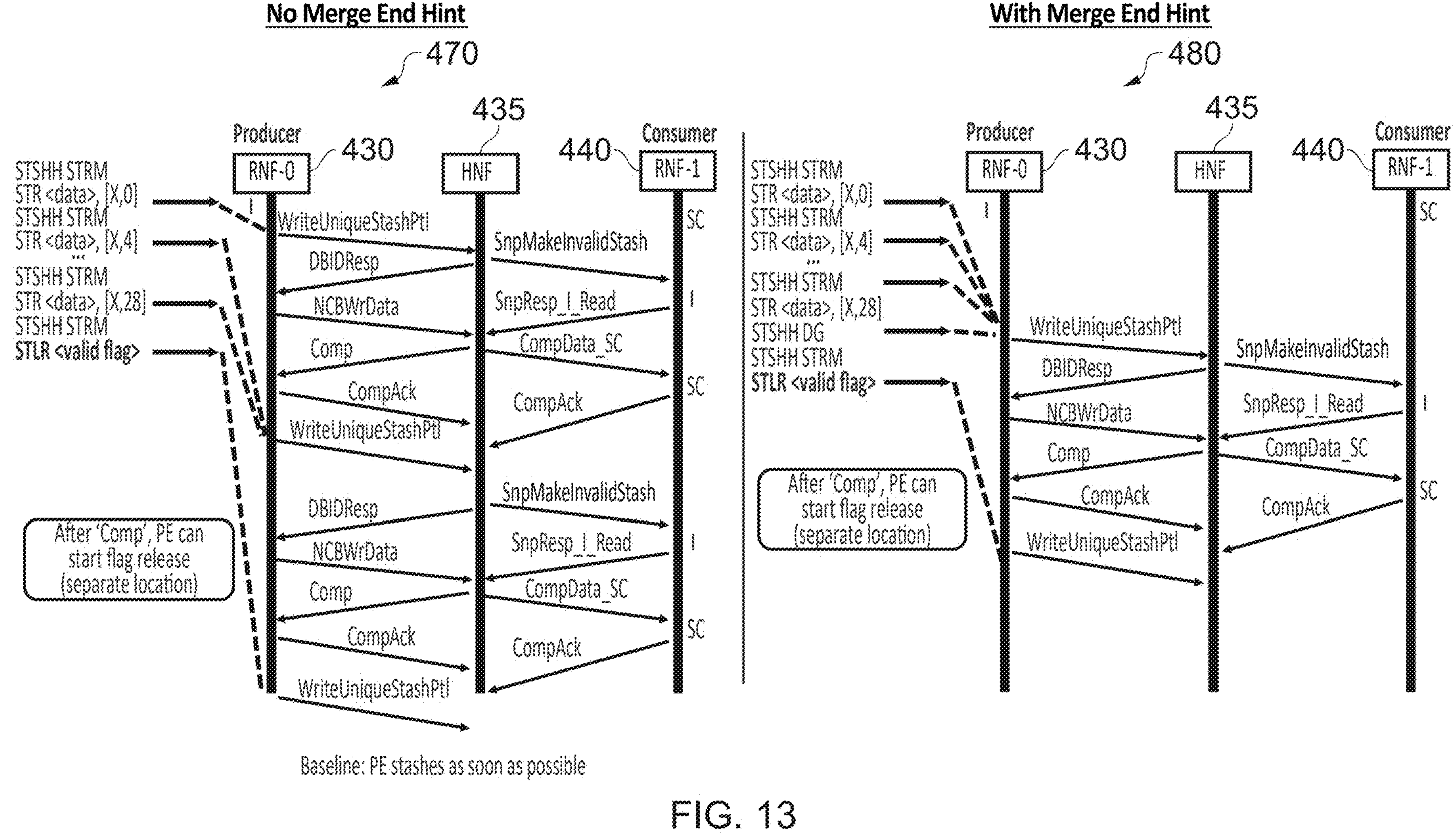

In some example implementations, in order to ensure a consistent view of data, a flag can be set in memory in association with an address aligned block of data (note the location of the flag will typically be a separate location in memory to the location of the address aligned block of data whose accessibility is controlled by the flag) and a store-release mechanism may be used to indicate when updated data for the address aligned block is considered valid and available for access. Hence, the producer might set the flag to a first state prior to performing the updates, and then may in due course execute a store release (STLR) instruction once the data updates have been made, in order to clear the state of the flag. Other entities within the system can poll the state of the flag in order to determine when the data locked by the flag has become available for reading. FIG. 13 illustrates the same sequence of interactions as shown in FIG. 12, but includes the subsequent STLR instruction that may be used when using a store-release mechanism.

As will be apparent from a comparison of the left-hand side of FIG. 13 with the right-hand side of FIG. 13, when adopting the techniques described herein the flag can be released significantly earlier, thus further reducing latency associated with accessing the updated data.

Figure 14:
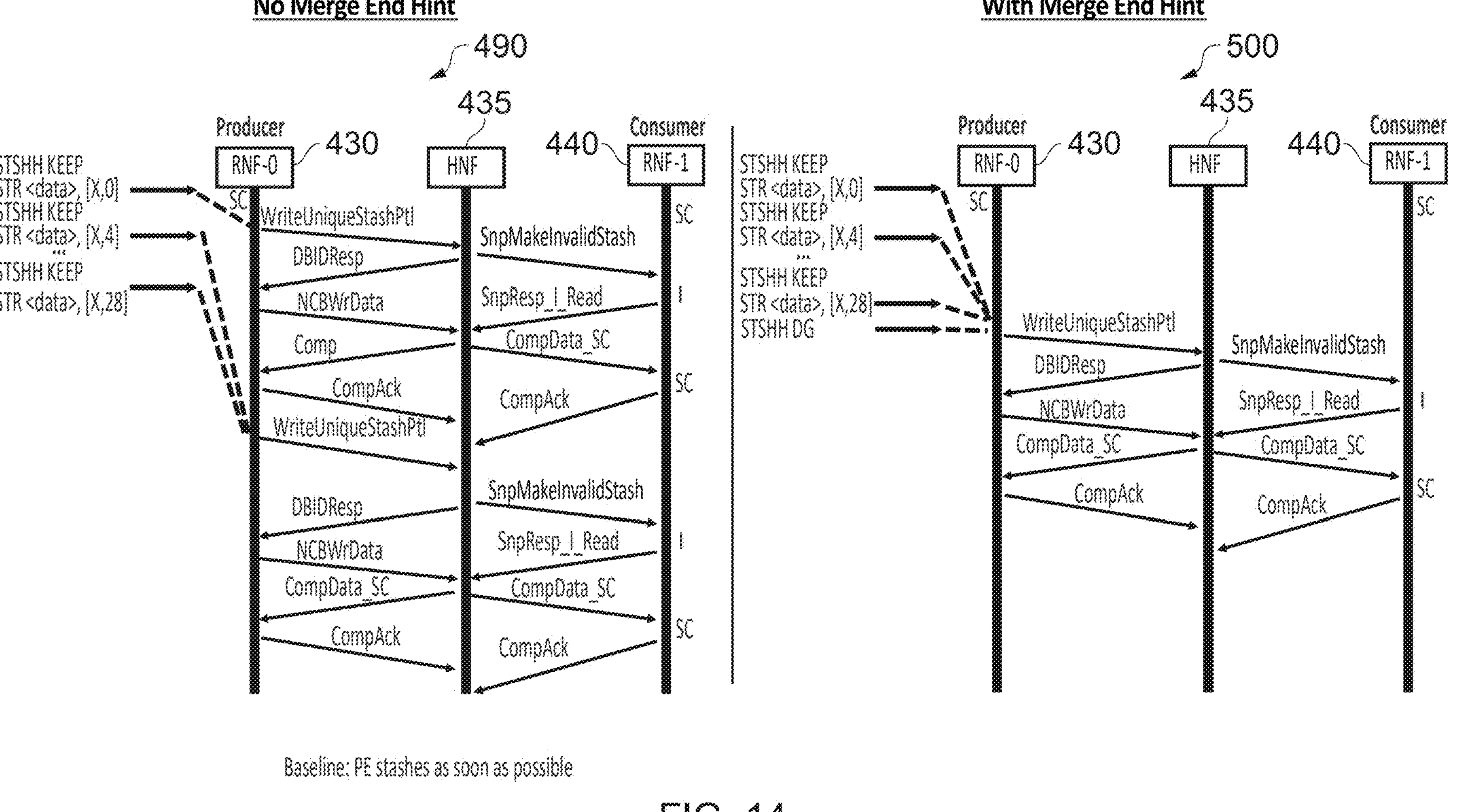
Figure 15:
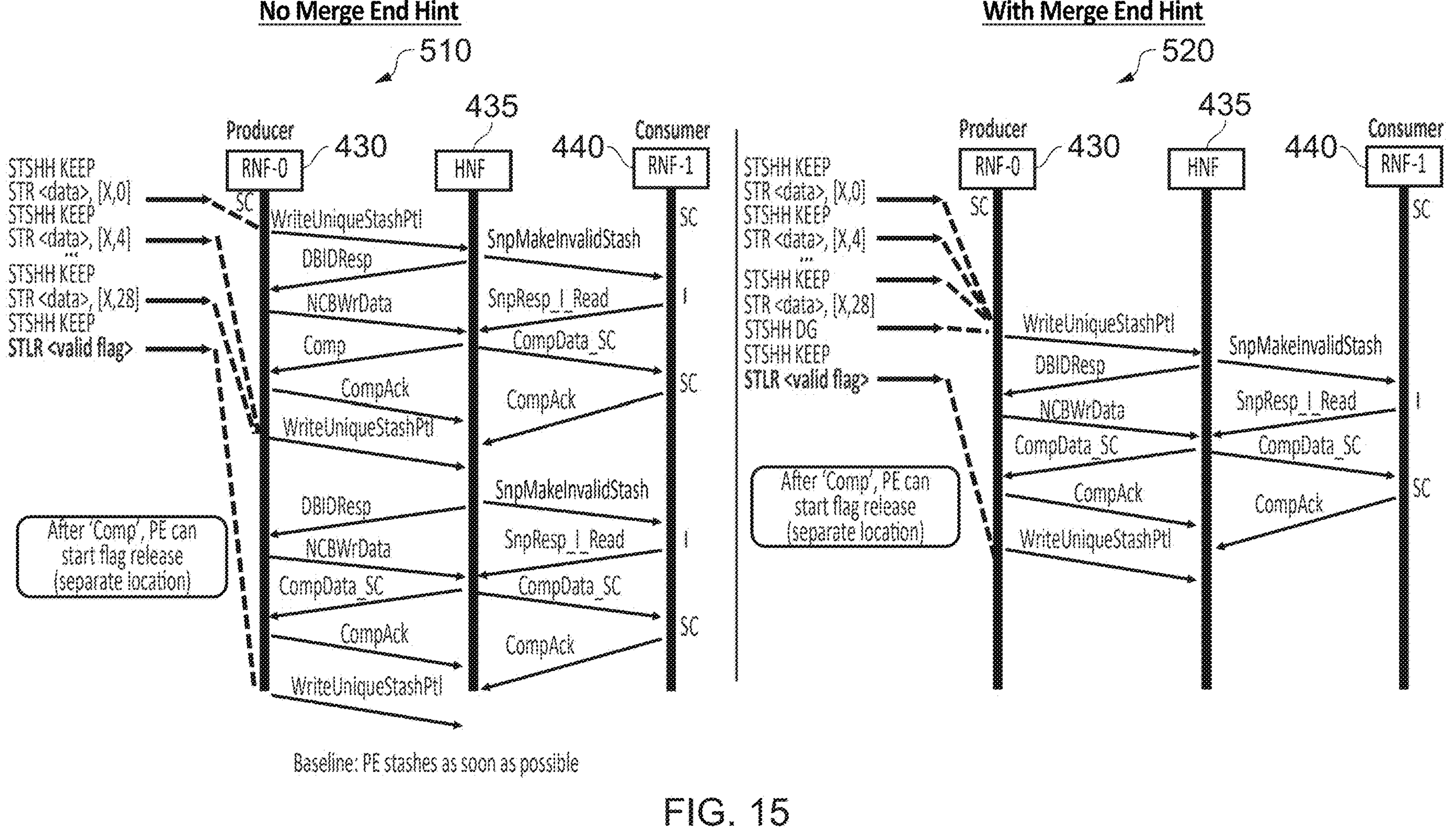

FIGS. 14 and 15 illustrate the same scenarios as discussed earlier with reference to FIGS. 12 and 13, but when using a "KEEP" variant of the stash hint instructions rather than the earlier discussed "STRM" variant. The "KEEP" variant indicates that the producer should retain a copy of the updated data in its local cache. As can be seen, the only difference between FIGS. 12, 13 and FIGS. 14, 15 is that the producer 430 accordingly retains a copy of the data in its local cache in the shared clean (SC) state. As discussed earlier with reference to FIG. 6, the provision of the completion signal from the home node 435 to the producer 430 indicates that the producer can store the updated data in the shared clean state in its local cache.

In one example implementation, the processing circuitry 14 may be responsive to a stashing prioritisation trigger to prioritise for retention in the merge buffer 17, until the stashing specific merge end trigger is detected, an address aligned block containing updated data to be made available for stashing. As noted earlier, on occurrence of certain events, the merge buffer will be required to output some of the data held therein, for example to free up space in the merge buffer. However, if it is known that, for a given address aligned block containing data to be stashed, there is an expectation that the stashing specific merge end trigger will be generated in due course to identify when a merged data update stashing transaction should be issued for the data of that given address aligned block, then it can be beneficial to seek to retain that given address aligned block within the merge buffer, and instead output the data for one or more other address aligned blocks in order to free up the required space within the merge buffer.

Figure 16:
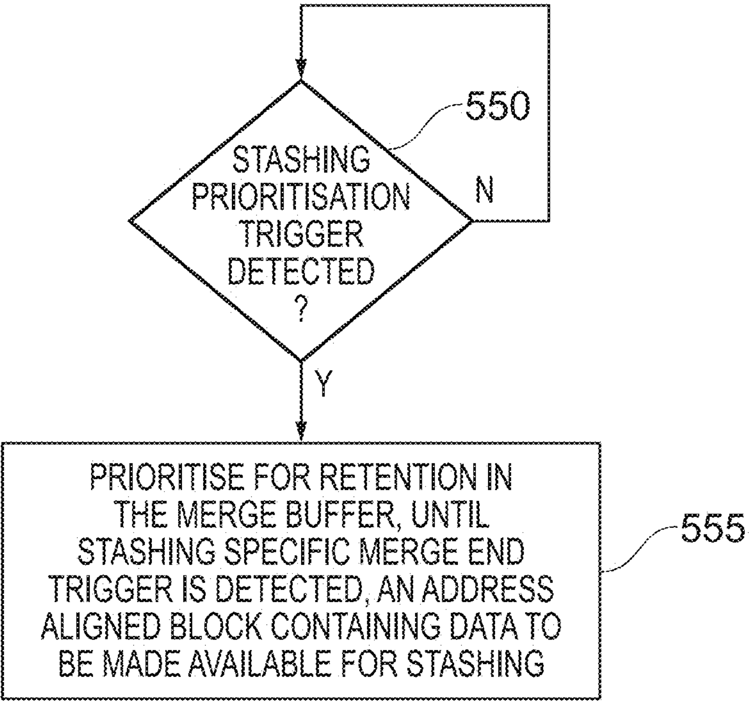
FIG. 16 is a flow diagram illustrating the use of a stashing prioritisation trigger in accordance with one example implementation.

FIG. 16 is a flow diagram schematically illustrating such a process. At step 550, it is determined whether a stashing prioritisation trigger is detected. There are various ways in which the stashing prioritisation trigger could be generated. For example, an explicit retention hint instruction could be provided that could then be added to the sequence of instructions to identify when it is desired to prioritise for retention in the merge buffer an address aligned block containing updated data to be made available for stashing. Thus execution of the retention hint instruction would provide the stashing prioritisation trigger. Alternatively, there may be considered no need for an explicit instruction, and instead the stashing prioritisation trigger could be generated in other scenarios. For example, the earlier discussed stash hint instruction could be used to generate the stashing prioritisation trigger. As a yet further example, the stashing prioritisation trigger could be used when the apparatus is operating in certain modes of operation (as indicated for example by the value in a control register), and is generating data for stashing.

When a stashing prioritisation trigger is detected, then at step 555 the processing circuitry is arranged to prioritise for retention in the merge buffer an address aligned block containing dates to be made available for stashing, until such time as the earlier discussed stashing specific merge end trigger is detected.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 17:
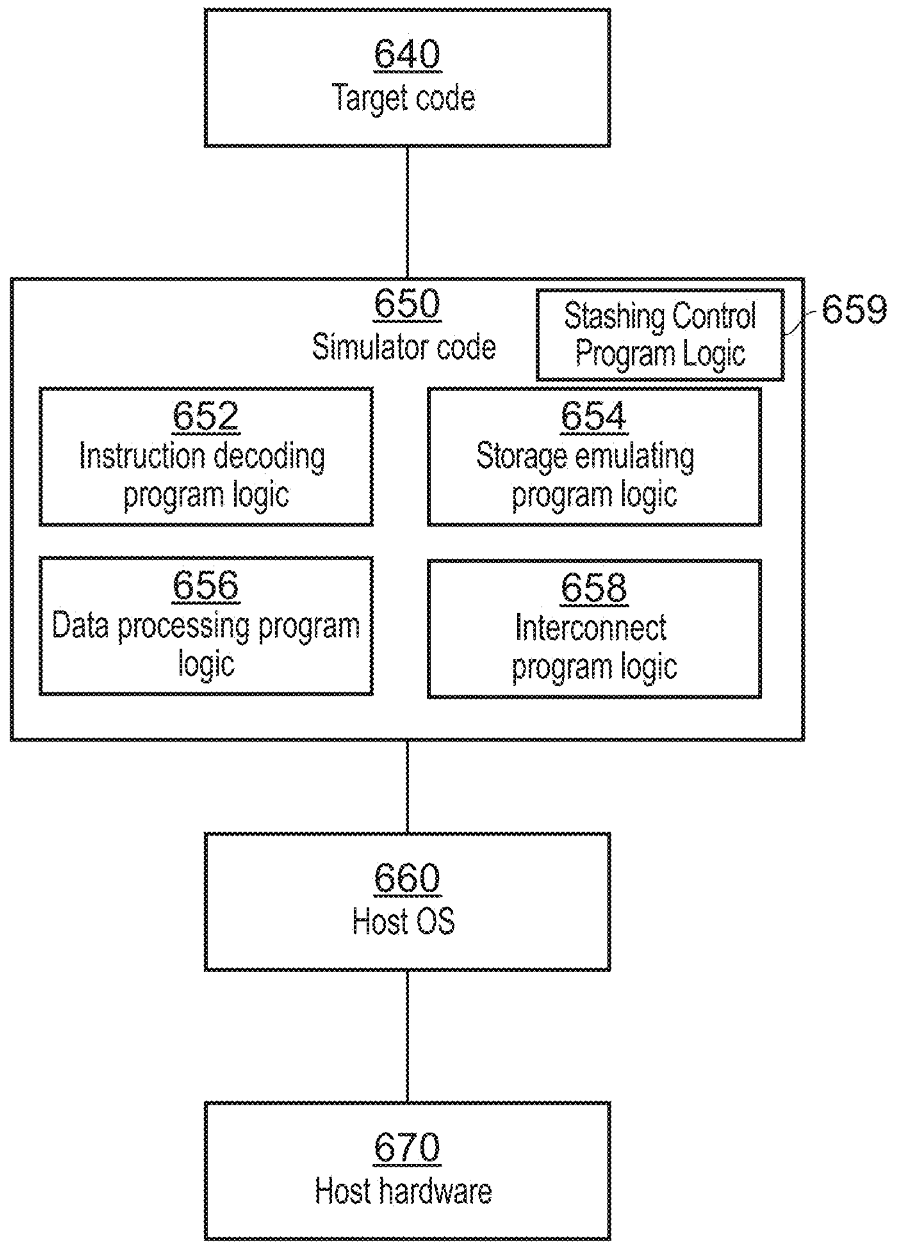
FIG. 17 illustrates a simulator implementation.

FIG. 17 illustrates a simulator implementation that may be used. Whilst the earlier described embodiments implement the described techniques in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators.

Typically, a simulator implementation may run on a host processor 670, optionally running a host operating system 660, supporting the simulator program 650. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 670), some simulated embodiments may make use of the host hardware, where suitable.

For example, the simulator code 650 may include instruction decoding program logic 652 to decode instructions in the target code—hence, the instruction decoding program logic may emulate the instruction decoder circuitry 12 described earlier. The simulator program may also include data processing program logic 656 to process instructions in the target code 640 (and hence emulate processing circuitry 14). In addition, the simulator code 650 may provide stashing control program logic 659 to handle stashing of updated data (and hence emulate the stashing control circuitry 55), interconnect program logic 658 to emulate the interconnect circuitry 50, and storage emulating program logic 654 to emulate an associated storage structure (for example a cache) of one or more processing elements.

The simulator program 650 may be stored on a computer-readable storage medium (which may be a non-transitory medium), and provides a program interface (instruction execution environment) to the target code 640 (which may include applications, operating systems and a hypervisor) which is the same as the interface of the hardware architecture being modelled by the simulator program 650. Thus, the program instructions of the target code 640, including the earlier-mentioned stash hint instructions, stashee hint instructions, merge end instructions and retention hint instructions may be executed from within the instruction execution environment using the simulator program 650, so that a host computer 670 which does not actually have the hardware features of the apparatus discussed above can emulate these features.

Some Example Configurations Are Set out in the Following Numbered Clauses:

1. An apparatus comprising:
   decoder circuitry within a first processing element to decode instructions, wherein the decoder circuitry is responsive to a sequence of instructions to generate control signals;
   processing circuitry within the first processing element that is responsive to the control signals to perform operations defined by the sequence of instructions; and
   an interface to couple the first processing element to interconnect circuitry;
   wherein:
   the processing circuitry is arranged, whilst a merging condition is determined to be present, to be responsive to the control signals received from the decoder circuitry due to decoding N data update instructions that each specify updated data to be made available for stashing, where N is an integer greater than or equal to 1, to buffer in a merge buffer the updated data specified by the N data update instructions;
   the processing circuitry is arranged, when the merging condition is determined to be no longer present, to initiate a merged data update stashing transaction via the interface specifying, as merged updated data, the updated data specified by the N data update instructions, in order to trigger stashing control circuitry accessible via the interconnect circuitry to cause the merged updated data to be made available for stashing in an associated storage structure of at least one further processing element coupled to the interconnect circuitry; and
   the processing circuitry is responsive to a stashing specific merge end trigger to determine that the merging condition is no longer present.
2. An apparatus as in Clause 1, wherein:
   the decoder circuitry is responsive to a merge end hint instruction in the sequence of instructions to issue at least one control signal to cause the processing circuitry to determine presence of the stashing specific merge end trigger.
3. An apparatus as in Clause 2, wherein the merge end hint instruction is positioned within the sequence of instructions so as to enable the processing circuitry to determine a final data update instruction amongst the N data update instructions whose specified updated data should be included in the merged updated data.
4. An apparatus as in Clause 2 or Clause 3, wherein the merge end hint instruction is arranged to indicate that no more updated data to be included in the merged updated data is expected to be specified by any data update instruction included in the sequence of instructions after the merge end hint instruction in program order.
5. An apparatus as in any preceding clause, wherein:
   the merge buffer is arranged to handle data in address aligned blocks of block size B, and to merge a given data item received by the merge buffer into a given address aligned block selected in dependence on an address of the given data item; and
   the processing circuitry is arranged to detect the stashing specific merge end trigger when at least one of the following conditions is detected:
   - the updated data to be made available for stashing fills an entire address aligned block;
   - the updated data to be made available for stashing, at least when a given update pattern is present, reaches a block boundary of a given address aligned block into which the updated data is being merged.
6. An apparatus as in Clause 5, wherein the processing circuitry is responsive to a stashing prioritisation trigger to prioritise for retention in the merge buffer, until the stashing specific merge end trigger is detected, an address aligned block containing updated data to be made available for stashing.
7. An apparatus as in any preceding clause, wherein the processing circuitry is arranged, on detection of a given event, to open a merging window, to consider the merging condition to be present whilst the merging window is open, and to close the merging window in response to the stashing specific merge end trigger.
8. An apparatus as in Clause 7, wherein the processing circuitry is arranged to detect the given event in association with processing a given data update instruction that provides updated data for a given address aligned block into which the updated data to be made available for stashing is to be merged.
9. An apparatus as in any preceding clause, wherein each associated storage structure is a cache used to cache data for access by each processing element that has access to that associated storage structure.
10. An apparatus as in any preceding clause, wherein:
    at least one of the N data update instructions that specifies updated data to be made available for stashing is a given data update stashing instruction.
11. An apparatus as in any preceding clause, wherein:
    the decoder circuitry is responsive to a stash hint instruction associated with a given data update instruction in the sequence of instructions, to issue control signals to cause the processing circuitry to respond to the given data update instruction by treating the given data update instruction as being one of the N data update instructions that specifies updated data to be made available for stashing.

12. An apparatus as in Clause 11, wherein the given data update instruction is a next data update instruction following the stash hint instruction in the sequence of instructions.

13. An apparatus as in Clause 11 or Clause 12, wherein the processing circuitry has a local associated storage structure, and the stash hint instruction identifies whether the updated data specified by the associated given data update instruction should be stored in the local associated storage structure as well as being included within the merged updated data to be made available for stashing in the associated storage structure of the at least one further processing element coupled to the interconnect circuitry.

14. An apparatus as in any preceding clause, further comprising:
   the stashing control circuitry arranged, responsive to the merged data update stashing transaction, to reference stashing control information to determine, from amongst a plurality of further processing elements coupled to the interconnect circuitry, one or more candidate further processing elements for stashing of the merged updated data, each candidate further processing element having an associated storage structure;
   wherein the stashing control circuitry is further arranged to cause one or more stashing control signals to be issued to each candidate further processing element to enable the merged updated data to be stashed in that candidate further processing element's associated storage structure.

15. An apparatus as in Clause 14, further comprising a stashing control storage to maintain the stashing control information referenced by the stashing control circuitry.

16. An apparatus as in Clause 14, wherein the stashing control information is specified by the merged data update stashing transaction.

17. An apparatus as in any of clauses 14 to 16, further comprising:
   the interconnect circuitry to interconnect a plurality of elements that are coupled to the interconnect circuitry, the plurality of elements comprising at least the first processing element and the at least one further processing element;
   wherein:
   multiple processing elements amongst the first processing element and the at least one further processing element have associated storage structures;
   the interconnect circuitry has coherency management circuitry to maintain coherency of data accessible by the multiple processing elements; and
   the stashing control circuitry is associated with the coherency management circuitry to cause the one or more stashing control signals to be integrated with coherency control signals issued by the coherency management circuitry to maintain coherency for the updated data.

18. A method of controlling stashing of data, comprising:
   decoding a sequence of instructions within decoder circuitry of a first processing element in order to generate control signals;
   responsive to the control signals, performing within processing circuitry of the first processing element operations defined by the sequence of instructions;
   in response to the control signals received from the decoder circuitry due to decoding N data update instructions that each specify updated data to be made available for stashing, where N is an integer greater than or equal to 1, causing the processing circuitry to buffer the updated data specified by the N data update instructions whilst a merging condition is determined to be present;
   when the merging condition is determined to be no longer present, causing the processing circuitry to initiate a merged data update stashing transaction via an interface used to couple the first processing element to interconnect circuitry, the merged data update stashing transaction specifying, as merged updated data, the updated data specified by the N data update instructions, and triggering stashing control circuitry accessible via the interconnect circuitry to cause the merged updated data to be made available for stashing in an associated storage structure of at least one further processing element coupled to the interconnect circuitry; and
   responsive to a stashing specific merge end trigger, causing the processing circuitry to determine that the merging condition is no longer present.

19. A computer program comprising instructions which, when executed by a host data processing apparatus, control the host data processing apparatus to provide an instruction execution environment for executing target program code, the computer program comprising:
   instruction decoding program logic associated with a first processing element to decode instructions, wherein the instruction decoding program logic is responsive to a sequence of instructions to generate control signals; and
   data processing program logic associated with the first processing element to be responsive to the control signals to perform operations defined by the sequence of instructions;
   wherein:
   the data processing program logic is arranged, whilst a merging condition is determined to be present, to be responsive to the control signals received from the instruction decoding program logic due to decoding N data update instructions that each specify updated data to be made available for stashing, where N is an integer greater than or equal to 1, to buffer the updated data specified by the N data update instructions;
   the data processing program logic is arranged, when the merging condition is determined to be no longer present, to assert a merged data update stashing transaction to interconnect program logic, the merged data update stashing transaction specifying, as merged updated data, the updated data specified by the N data update instructions, and being arranged to trigger stashing control program logic accessible via the interconnect program logic to cause the merged updated data to be made available for stashing in storage emulating program logic used to emulate an associated storage structure of at least one further processing element coupled to the interconnect program logic; and the data processing program logic is responsive to a stashing specific merge end trigger to determine that the merging condition is no longer present.

20. A computer-readable medium storing computer-readable code for fabrication of the apparatus of any of clauses 1 to 17.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

decoder circuitry within a first processing element to decode instructions, wherein the decoder circuitry is responsive to a sequence of instructions to generate control signals;

processing circuitry within the first processing element that is responsive to the control signals to perform operations defined by the sequence of instructions; and an interface to couple the first processing element to interconnect circuitry;

wherein:

the processing circuitry is configured, whilst a merging condition is determined to be present, to be responsive to the control signals received from the decoder circuitry due to decoding N data update instructions that each specify updated data to be made available for stashing in an associated storage structure of at least one further processing element coupled to the interconnect circuitry, where N is an integer greater than or equal to 1, to buffer in a merge buffer the updated data to be made available for stashing specified by the N data update instructions;

the processing circuitry is configured, when the merging condition is determined to be no longer present, to initiate a merged data update stashing transaction via the interface specifying, as merged updated data, the updated data specified by the N data update instructions buffered in the merge buffer, in order to trigger stashing control circuitry accessible via the interconnect circuitry to cause the merged updated data to be made available for stashing in the associated storage structure of the at least one further processing element coupled to the interconnect circuitry; and the processing circuitry is responsive to a stashing specific merge end trigger to determine that the merging condition is no longer present.

2. An apparatus as claimed in claim 1, wherein:

the decoder circuitry is responsive to a merge end hint instruction in the sequence of instructions to issue at least one control signal to cause the processing circuitry to determine presence of the stashing specific merge end trigger.

3. An apparatus as claimed in claim 2, wherein the merge end hint instruction is positioned within the sequence of instructions so as to enable the processing circuitry to determine a final data update instruction amongst the N data update instructions whose specified updated data should be included in the merged updated data.

4. An apparatus as claimed in claim 2, wherein the merge end hint instruction is configured to indicate that no more updated data to be included in the merged updated data is expected to be specified by any data update instruction included in the sequence of instructions after the merge end hint instruction in program order.

5. An apparatus as claimed in claim 1, wherein:

the merge buffer is configured to handle data in address aligned blocks of block size B, and to merge a given data item received by the merge buffer into a given address aligned block selected in dependence on an address of the given data item; and the processing circuitry is configured to detect the stashing specific merge end trigger when at least one of the following conditions is detected:

the updated data to be made available for stashing fills an entire address aligned block;

the updated data to be made available for stashing, at least when a given update pattern is present, reaches a block boundary of a given address aligned block into which the updated data is being merged.

6. An apparatus as claimed in claim 5, wherein the processing circuitry is responsive to a stashing prioritisation trigger to prioritise for retention in the merge buffer, until the stashing specific merge end trigger is detected, an address aligned block containing updated data to be made available for stashing.

7. An apparatus as claimed in claim 1, wherein the processing circuitry is configured, on detection of a given event, to open a merging window, to consider the merging condition to be present whilst the merging window is open, and to close the merging window in response to the stashing specific merge end trigger.

8. An apparatus as claimed in claim 7, wherein the processing circuitry is configured to detect the given event in association with processing a given data update instruction that provides updated data for a given address aligned block into which the updated data to be made available for stashing is to be merged.

9. An apparatus as claimed in claim 1, wherein each associated storage structure is a cache used to cache data for access by each processing element that has access to that associated storage structure.

10. An apparatus as claimed in claim 1, wherein:

at least one of the N data update instructions that specifies updated data to be made available for stashing is a given data update stashing instruction.

11. An apparatus as claimed in claim 1, wherein:

the decoder circuitry is responsive to a stash hint instruction associated with a given data update instruction in the sequence of instructions, to issue control signals to cause the processing circuitry to respond to the given data update instruction by treating the given data update instruction as being one of the N data update instructions that specifies updated data to be made available for stashing.

12. An apparatus as claimed in claim 11, wherein the given data update instruction is a next data update instruction following the stash hint instruction in the sequence of instructions.

13. An apparatus as claimed in claim 11, wherein the processing circuitry has a local associated storage structure, and the stash hint instruction identifies whether the updated data specified by the associated given data update instruction should be stored in the local associated storage structure as well as being included within the merged updated data to be made available for stashing in the associated storage structure of the at least one further processing element coupled to the interconnect circuitry.

14. An apparatus as claimed in claim 1, further comprising:

the stashing control circuitry configured, responsive to the merged data update stashing transaction, to reference stashing control information to determine, from amongst a plurality of further processing elements coupled to the interconnect circuitry, one or more candidate further processing elements for stashing of the merged updated data, each candidate further processing element having an associated storage structure;

wherein the stashing control circuitry is further configured to cause one or more stashing control signals to be issued to each candidate further processing element to enable the merged updated data to be stashed in that candidate further processing element's associated storage structure.

15. An apparatus as claimed in claim 14, further comprising a stashing control storage to maintain the stashing control information referenced by the stashing control circuitry.

16. An apparatus as claimed in claim 14, wherein the stashing control information is specified by the merged data update stashing transaction.

17. An apparatus as claimed in claim 14, further comprising:

the interconnect circuitry to interconnect a plurality of elements that are coupled to the interconnect circuitry, the plurality of elements comprising at least the first processing element and the at least one further processing element;

wherein:

multiple processing elements amongst the first processing element and the at least one further processing element have associated storage structures;

the interconnect circuitry has coherency management circuitry to maintain coherency of data accessible by the multiple processing elements; and the stashing control circuitry is associated with the coherency management circuitry to cause the one or more stashing control signals to be integrated with coherency control signals issued by the coherency management circuitry to maintain coherency for the updated data.

18. A method of controlling stashing of data, comprising:

decoding a sequence of instructions within decoder circuitry of a first processing element coupled to interconnect circuitry, in order to generate control signals;

responsive to the control signals, performing within processing circuitry of the first processing element operations defined by the sequence of instructions;

determining that a merging condition is present;

in response to the control signals received from the decoder circuitry due to decoding N data update instructions that each specify updated data to be made available for stashing in an associated storage structure of at least one further processing element coupled to the interconnect circuitry, where N is an integer greater than or equal to 1, and determining that the merging condition is present, causing the processing circuitry to buffer the updated data to be made available for stashing specified by the N data update instructions;

detecting a stashing specific merge end trigger, and determining that the merging condition is no longer present in response to the stashing specific merge end trigger; and in response to determining that the merging condition is no longer present, causing the processing circuitry to initiate a merged data update stashing transaction via an interface used to couple the first processing element to the interconnect circuitry, the merged data update stashing transaction specifying, as merged updated data, the updated data specified by the N data update instructions buffered in the merge buffer, and triggering stashing control circuitry accessible via the interconnect circuitry to cause the merged updated data to be made available for stashing in the associated storage structure of the at least one further processing element coupled to the interconnect circuitry.

19. A non-transitory computer-readable medium storing computer-readable code for fabrication of the apparatus of claim 1.

* * * * *